(12) United States Patent
Balasubramanian et al.

(10) Patent No.: US 10,771,669 B1
(45) Date of Patent: Sep. 8, 2020

(54) TIME SYNCHRONIZATION OF SENSOR DATA

(71) Applicants: Koussalya Balasubramanian, Santa Clara, CA (US); Paul A. Baker, Los Altos, CA (US); Harold C. Ockerse, Sunnyvale, CA (US); Brent E. Tweddle, Sunnyvale, CA (US)

(72) Inventors: Koussalya Balasubramanian, Santa Clara, CA (US); Paul A. Baker, Los Altos, CA (US); Harold C. Ockerse, Sunnyvale, CA (US); Brent E. Tweddle, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 57 days.

(21) Appl. No.: 16/126,030

(22) Filed: Sep. 10, 2018

Related U.S. Application Data

(60) Provisional application No. 62/563,268, filed on Sep. 26, 2017.

(51) Int. Cl.
| | |
|---|---|
| *H04N 5/232* | (2006.01) |
| *H04N 5/235* | (2006.01) |
| *G01S 7/497* | (2006.01) |
| *G01S 17/89* | (2020.01) |

(52) U.S. Cl.
CPC ......... *H04N 5/23203* (2013.01); *G01S 7/497* (2013.01); *G01S 17/89* (2013.01); *H04N 5/2353* (2013.01)

(58) Field of Classification Search
CPC .. H04N 5/23203; H04N 5/2353; G01S 7/497; G01S 17/89

USPC .......................................................... 348/135
See application file for complete search history.

(56) References Cited

U.S. PATENT DOCUMENTS

| | | | |
|---|---|---|---|
| 5,442,358 | A | 8/1995 | Keeler et al. |
| 6,664,529 | B2 | 12/2003 | Pack et al. |
| 9,361,650 | B2 | 6/2016 | Binion et al. |
| 9,555,883 | B1 | 1/2017 | Navot et al. |
| 2010/0171841 | A1* | 7/2010 | Dobrin ............. H04N 21/21805 348/222.1 |

(Continued)

OTHER PUBLICATIONS

Otto, C., "Fusion of Data From Heterogeneous Sensors With Distributed Fields of View and Situation Evaluation for Advanced Driver Assistance Systems", KIT Scientific Publishing, Jun. 6, 2013 (262 pp).

*Primary Examiner* — Allen C Wong
(74) *Attorney, Agent, or Firm* — Young Basile Hanlon & MacFarlane, P.C.

(57) ABSTRACT

Sensor data produced in a multi-sensor environment is time synchronized, such as using a master time. A component that derives the master time transmits a signal to a first sensor of the multi-sensor environment, which signal indicates the master time. The component subsequently receives a signal from the first sensor, which signal indicates a first time determined by the first sensor based on the master time and a latency associated with the first sensor. The first time indicates a time of an event associated with the first sensor data. A determination is then made that the first sensor data corresponds to second sensor data produced using a second sensor of the multi-sensor environment based on the first time and a second time indicating a time of an event associated with the second sensor data.

30 Claims, 10 Drawing Sheets

(56) References Cited

U.S. PATENT DOCUMENTS

| | | | |
|---|---|---|---|
| 2015/0323449 A1* | 11/2015 | Jones | G01N 21/3103 356/437 |
| 2016/0116593 A1* | 4/2016 | Kim | B60T 7/22 701/70 |
| 2018/0039485 A1* | 2/2018 | Wilber | G06F 7/588 |
| 2018/0106903 A1* | 4/2018 | Iida | G01S 7/4817 |

* cited by examiner

US 10,771,669 B1

TIME SYNCHRONIZATION OF SENSOR DATA

CROSS-REFERENCE TO RELATED APPLICATIONS

This application claims the benefit of U.S. Provisional Application No. 62/563,268, filed on Sep. 26, 2017, the content of which is hereby incorporated by reference in its entirety for all purposes.

TECHNICAL FIELD

This disclosure relates to time synchronization of sensor data.

BACKGROUND

Various sensors included in an environment may be used to measure or otherwise produce data, such as based on an event. The time required for the hardware and/or software associated with a sensor to produce such data may be specific to that sensor.

SUMMARY

One implementation disclosed herein includes a method for time synchronization of sensor data in a multi-sensor environment using a master time. The method includes transmitting, from a component that derives the master time, a first signal to a first sensor of the multi-sensor environment, the first signal indicating the master time and including a trigger for causing the first sensor to generate first sensor data. The method also includes receiving, by the component, a second signal from the first sensor, the second signal indicating a first time determined by the first sensor based on the master time and a latency associated with the first sensor, the first time indicating a time for an event associated with the first sensor data. The method also includes determining that the first sensor data corresponds to second sensor data generated using a second sensor of the multi-sensor environment, the determining based on the first time and a second time indicating a time for an event associated with the second sensor data.

Another implementation disclosed herein includes a non-transitory computer-readable storage device including program instructions executable by one or more processors that, when executed, cause the one or more processors to perform operations for time synchronization of sensor data in a multi-sensor environment. The operations include transmitting, at a master time according to a master clock for the multi-sensor environment, a first signal to a first sensor, the first signal including a trigger for causing the first sensor to produce first sensor data at a first time. The operations also include transmitting, at approximately the master time, a second signal to a second sensor to cause the second sensor to produce second sensor data at a second time. The operations also include receiving the first sensor data and the first time from the first sensor and the second sensor data and the second time from the second sensor. The operations also include adjusting at least one of the first time or the second time according to latencies associated with respective ones of the first sensor and the second sensor, wherein, subsequent to the adjusting, the first time and the second time reflect times according to the master clock.

Another implementation disclosed herein includes a system for time synchronization of sensor data. The system includes one or more sensors including a lidar sensor and a camera, a memory, and a processor configured to execute instructions stored in the memory to transmit, at a master time according to a master clock of the system, a first signal to the lidar sensor, the first signal causing the lidar sensor to produce lidar data indicative of a distance to an object at a lidar time. The processor is also configured to execute instructions stored in the memory to transmit, at a time representative of a phase offset from the master time, a second signal to the camera, the second signal including a trigger for causing the camera to produce camera data at a camera time, the phase offset based on the lidar time. The processor is also configured to execute instructions stored in the memory to receive the lidar data and the lidar time from the lidar sensor and the camera data and the camera time from the camera. The processor is also configured to execute instructions stored in the memory to determine, based on the lidar time and the camera time, that the camera data corresponds to the lidar data. The processor is also configured to execute instructions stored in the memory to associate a timing of an event with the lidar data and the camera data, wherein the event corresponds to the object and the timing of the event reflects a time according to the master clock.

DETAILED DESCRIPTION

A stationary or mobile structure may include multiple sensors to measure events occurring with respect to the structure, such as changes in the proximity of objects to the structure, changes in acceleration of the structure, or the like. The sensor data produced using multiple ones of the sensors may measure the same event. It may thus be useful to determine correspondence between the sensor data produced using different sensors. However, the sensors of the structure may not be time synchronized with one another.

For example, individual ones of the sensors may use localized sensor clocks to determine times at which events are measured using those sensors. As such, a single event measured using two different sensors may be identified as occurring at two different times. Further, the sensors may have different latencies for producing sensor data, such as based on the time it takes for the hardware and/or software associated with the sensor to operate. The different latencies may introduce a further variation on the times at which sensor data is produced using multiple sensors. This lack of synchronization between sensor clocks may complicate the determinations of correspondence between sensor data produced using two or more sensors.

Implementations of this disclosure include systems and techniques for time synchronization of sensor data using a master time for a structure that includes multiple sensors. As used herein, a stationary or mobile structure including multiple sensors may be referred to as a multi-sensor environment. A multi-sensor environment uses a master clock to maintain a master time for synchronizing sensor data produced using multiple ones of the sensors. A component of or otherwise associated with the multi-sensor environment derives the master time from the master clock and transmits signals based on the master time to ones of the sensors. The signals may include signals for causing a sensor to produce sensor data on a periodic basis or triggers for causing the sensors to produce sensor data at particular times.

The component subsequently receives signals from the sensors that produced sensor data, which received may indicate times according to sensor clocks at which the sensor data were produced. The component may then determine times according to the master clock at which those sensor data were produced. Alternatively, or additionally, signals received from certain sensors may indicate times according to the master clock at which the sensor data were produced. The component determines whether the sensor data produced using multiple ones of the sensors correspond to one another based on the times at which the sensor data was produced according to the master clock.

Figure 1:
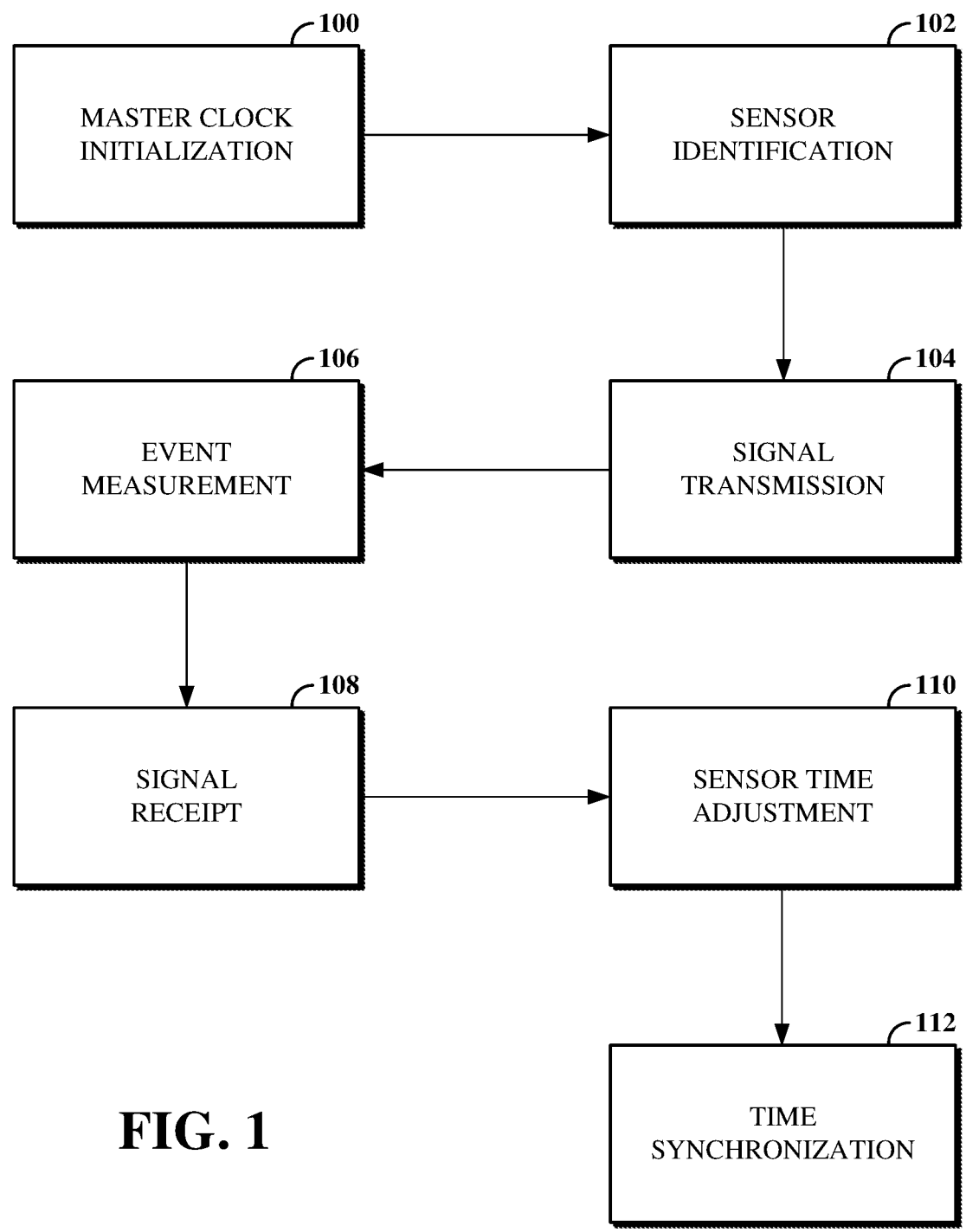
FIG. 1 is a block diagram showing an example of a system for time synchronization of sensor data.

FIG. 1 is a block diagram showing an example of a system for time synchronization of sensor data. The system may be implemented in whole or in part using a computing device including a memory and a processor. For example, the memory of the computing device may include program instructions that, when executed by the processor of the computing device, cause a whole or partial performance of the operations described with respect to the system. The system may be practiced with respect to a multi-sensor environment, such as described below with respect to FIG. 2.

The system performs operations for master clock initialization. The master clock is a mechanical or digital implement that measures a global time of the system, which global time is referred to herein as the master time. The master clock may be initialized using a battery-powered clock within the system. Alternatively, the master clock may be initialized based on use time information transmitted from a global positioning system (GPS). For example, the system may include a GPS component that receives time information from an external GPS or like geolocation system and transmits that time information for use in initializing the master clock.

After the master clock is initialized, operations for sensor identification 102 are performed. Multiple sensors can be used by the system to produce sensor data. The sensors can include hardware and/or software components that measure an event occurring with respect to the system. For example, an event may refer to an action performed against or nearby a structure implementing the system, an object being detected using sensors of the system, a change in the motion of the structure implementing the system, or the like, or a combination thereof. Ones of the sensors can therefore be used to detect an object outside of a structure implementing the system, determine a distance between that structure and the object, determine that the structure is passing by an object, or the like. The sensors may also include hardware and/or software components that measure aspects of the structure implementing the system. For example, ones of the sensors can be used to detect a position, orientation, linear velocity, angular velocity, linear acceleration, angular acceleration, or like quality of the structure implementing the system.

Examples of sensors that may be used with the system include lidar sensors, radar sensors, laser range sensors, visible light cameras, infrared light cameras (e.g., short-wave, mid-wave, or long-wave infrared light cameras), stereoscopic sensors, structured light sensors, Doppler velocity sensors (DVSs), inertial measurement units (IMUs), or the like. Other sensors not listed or described herein may also or instead be used with the system.

Multiple ones of the sensors may be used with the system. For example, the system may use two or more lidar sensors, two or more cameras of one or more camera types, two or more radar sensors, two or more IMUs, two or more DVSs, or the like, or a combination thereof. The system may use sensor data produced from multiple sensors over multiple sampling periods. For example, sensor data can be produced during a first rotation of a lidar sensor, during a second rotation of the lidar sensor, or both.

Different ones of the sensors may produce different types of sensor data. For example, a camera, such as a visible light camera, produces sensor data indicative of one or more objects within a field of view of the camera. The sensor data produced using a camera may be referred to as camera data. Camera data may, for example, include one or more images captured using a film or digital sensor of a camera. In another example, a range sensor, such as a lidar sensor or a radar sensor, produces sensor data indicative of a distance between the range sensor and one or more objects near the range sensor. A range sensor may produce multiple distance values corresponding to different locations or portions within a field of view of the range sensor.

The operations for sensor identification 102 can include operations for identifying the ones of the sensors included in the system. For example, the system can send a request or verification signal, and responsively listen for a response thereto, to one or more sensors. In another example, the system can identify the sensors based on configurations to the system. For example, the system may be configured to understand certain sensors to be present.

Subsequent to identifying the sensors of the system, signal transmission 104 is performed. Signal transmission includes transmitting signals to ones of the sensors of the system. The sensors may be transmitted from a control component of the system. As used herein, a signal transmitted with respect to the system (e.g., from a control component to a sensor or from a sensor to the control component, whether directly or indirectly, such as using an intermediate component) refers to a communication of data without specific reference to and/or regardless of fluctuations, variations, or values of voltage, modulation, clocking, or the like, and without specific reference to and/or regardless of protocols or other manners by which the data is communicated.

During the signal transmission 104, the control component transmits a signal to a sensor of the system to cause that sensor to measure an event and produce sensor data indicative of the event measurements. The control component may transmit signals to multiple ones of the sensors during the signal transmission 104. As will be described below, signals can be transmitted to sensors of the system to cause those sensors to capture data indicative of an event, for example, by including a digital trigger (e.g., a controller area network (CAN) trigger, a transistor-to-transistor logic (TTL) trigger, or the like) that, when received at the sensor, causes the sensor to produce sensor data. A signal transmitted from the control component may in some cases include an indication of the master time of the system. For example, the master time can be shared with a sensor of the system using a pulse-per-second (PPS) signal, a PPS signal including a National Marine Electronics Association (NMEA) message, or a like signal.

The event measurement 106 includes operations resulting in the production of sensor data using ones of the sensors. For example, for a lidar sensor, the event measurement 106 may include emitting lasers to measure a distance between the structure implementing the system and an object external to the system. In another example, for an IMU, the event measurement 106 may include detecting that a shaking or other motion is occurring with respect to at least a portion of the structure implementing the system.

The sensor data produced using the sensors is produced at a time according to sensor clocks of those sensors. Some or all of the sensors may have a sensor clock, which may be a mechanical or digital mechanism built into or otherwise associated with a sensor, such as based on a default configuration or other setting of the sensor. For example, a processor or like component associated with a sensor, which is configured to derive a sensor time from a sensor clock of the sensor, may determine the sensor time at which the sensor produces sensor data.

Signal receipt 108 occurs after the event measurement 106 is performed. The control component that transmitted the signals to cause the event measurement 106 may receive signals from the ones of the sensors that produced sensor data based on the event measurement 106. The signals received from the sensors may include the sensor data that was produced based on the event measurement 106. The signals received from the sensors may also include a time at which the sensor data was produced.

The system then performs operation for sensor time adjustment 110. In some cases, a signal received from a sensor may include a time according to a sensor clock at which the sensor produced sensor data, referred to as a sensor time of the sensor. In other cases, a signal received from a sensor may include a time according to the master clock at which the sensor produced sensor data, referred to as a master time of the sensor. For example, the control component may derive a master time from the master clock as a threshold step to the signal transmission 104. The control component may indicate the derived master time within some or all of the signals transmitted to the sensors. Some of the sensors that receive the indication of the master time may be able to adjust the sensor time to correspond to the master clock, such as based on the master time indicated in the signal transmitted to the sensor.

After applicable sensor times are adjusted to correspond to the master clock, time synchronization 112 is performed with respect to the sensor data produced using the sensors. The operations for time synchronization 112 may, for example, be performed by the control component that transmits and receives signals with respect to the sensors of the system. The time synchronization 112 may include comparing the master times of the sensors when respective sensor data were produced to determine whether multiple sensor data correspond the same event. For example, where multiple sensor data are determined to correspond to the same event, the system may use the multiple sensor data to cause some change to the system, such as to adjust a position or motion (e.g., speed, direction, or the like, or a combination thereof) of the structure implementing the system.

Implementations of the system shown in FIG. 1 may differ from that which is shown and described. In some implementations, one or more aspects of the system may be omitted. For example, operations for the master clock initialization 100 and the sensor identification 102 may be performed during an initialization of the system and therefore not repeated. As such, after a first time synchronization has occurred, the master clock may not be re-initialized or the sensors re-identified.

In some implementations, aspects of the system may be repeated before the operations for the time synchronization 112 are performed. For example, there may be multiple signal transmissions 104, event measurements 106, and signal receipts 108 before one or both of the sensor time adjustment 110 or the time synchronization 112. This may occur, for example, where the time synchronization 112 is used to synchronize multiple sets of signal transmissions and signal receipts over a discrete time period.

In some implementations, the operations may be performed in a different order than as shown and described. For example, the master clock initialization 100 operations may in some cases be performed after the sensor identification 102 operations.

Figure 2:
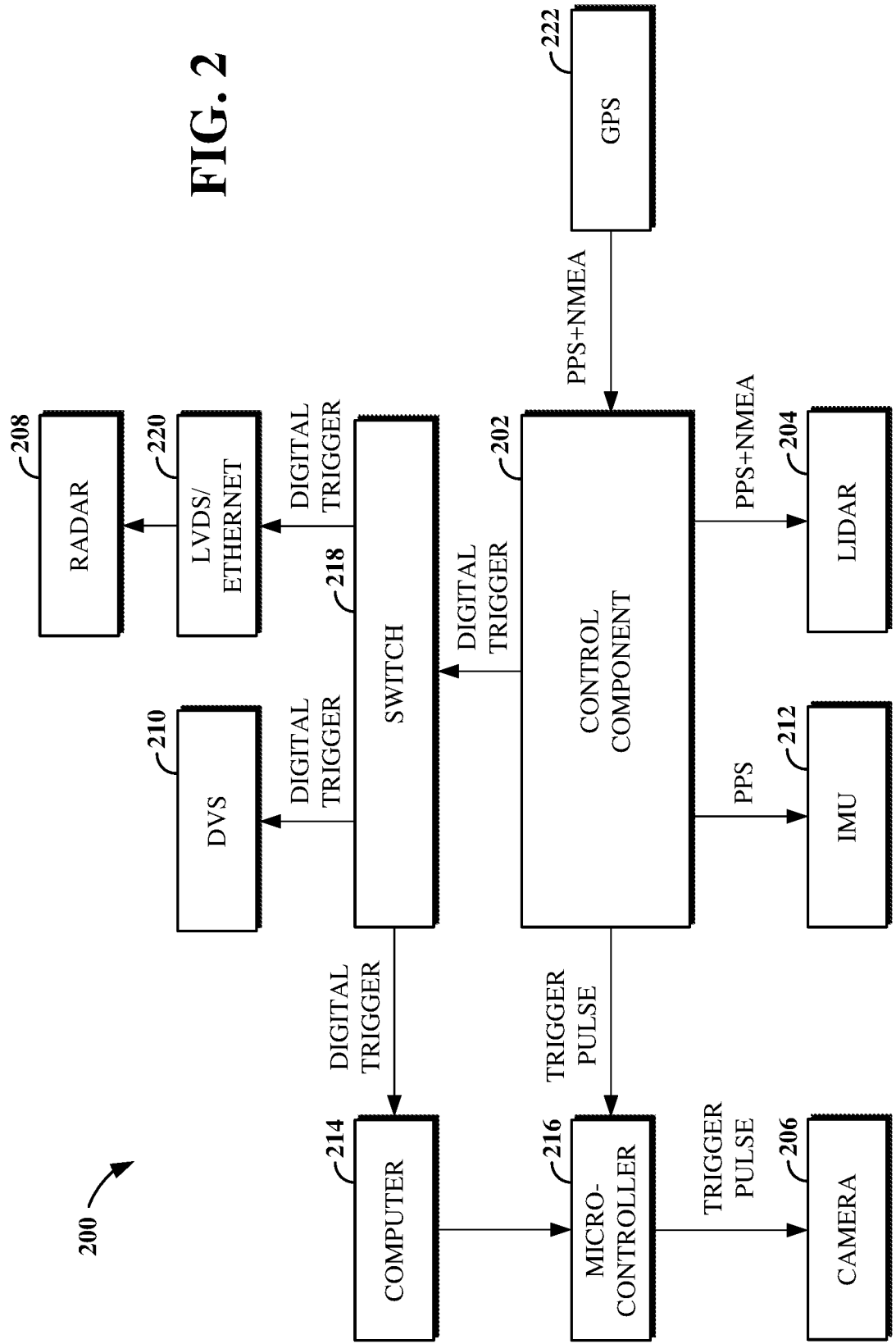
FIG. 2 is a block diagram showing an example of a multi-sensor environment.

FIG. 2 is a block diagram showing an example of a multi-sensor environment 200. The multi-sensor environment 200 is a structure including sensors. For example, the multi-sensor environment 200 may be a structure implementing the system described with respect to FIG. 1. The multi-sensor environment 200 may be a structure in motion. Alternatively, the multi-sensor environment 200 may be stationary. A motion or lack of motion of the multi-sensor environment 200 may be controlled from within the multi-sensor environment 200. For example, a control component 202 may control a motion or lack of motion of the multi-sensor environment 200. In another example, a different component or device, individually or in combination with the control component 202, may control a motion or lack of motion of the multi-sensor environment 200. Such other component or device may, for example, be hardware for controlling actuators used to enable or disable motion of the multi-sensor environment 200.

The control component 202 includes functionality for causing ones of the sensors of the multi-sensor environment 200 to produce sensor data. The control component 202 may be a computing device, such as described below with respect to FIG. 3. Alternatively, the control component 202 may be a microcontroller or like processing unit. As a further alternative, the control component 202 may be or include specialized hardware such as an application-specific integrated circuit (ASIC) or a field-programmable gate array (FPGA), or may be or include a combination of conventional computing devices and/or specialized hardware. The instructions by which the control component 202 causes the production of sensor data may be installed onto a hardware component of the control component 202.

The multi-sensor environment 200 is a heterogeneous sensor environment. The multi-sensor environment 200 may, for example, include a general-purpose input/output network (GPIO), a CAN, a series of Ethernet connections, or the like, or a combination thereof, to synchronize times and data produced using sensors of the multi-sensor environment 200. For example, where the multi-sensor environment uses a GPIO network, the control component 202 may include a single serial connection and a single input/output connection used to send signals.

The control component 202 causes sensors of the multi-sensor environment 200 to produce sensor data by transmitting signals to ones of those sensors. In the example shown, the sensors of the multi-sensor environment 200 include a lidar sensor 204, a camera 206, a radar sensor 208, a DVS 210, and an IMU 212. The control component 202 may use one or more mechanisms or protocols to communicate data with ones of those sensors. For example, the control component 202 may cause the lidar sensor 204 to produce lidar data by transmitting a PPS+NMEA signal to the lidar sensor 204 to indicate the current master time of the multi-sensor environment 200 to the lidar sensor 204. The lidar sensor 204 may then produce sensor data and time stamp the produced sensor data according to the master time shared using the PPS+NMEA signal.

In another example, the control component 202 may cause the camera 206 to produce camera data by transmitting a signal including a digital trigger (e.g., a CAN trigger) to a computer 214 associated with the camera 206. At the same or substantially the same time, the control component 202 may transmit a trigger pulse to a microcontroller 216 associated with the camera 206. The computer 214 may be a computing device or other specialized hardware for processing instructions to cause the camera 206 to produce camera data. The microcontroller 216 may be a device used to relay instructions to produce the camera data to the camera 206. For example, the microcontroller 216 may be a frame grabber. The camera 206 may, in some implementations, be one of a plurality of cameras. In such an implementation, the microcontroller 216 can use the trigger pulse received from the control component 202 and instructions received from the computer 214 to cause certain ones of the cameras to produce camera data at a given time.

In another example, the control component 202 may cause the radar sensor 208 to produce radar data by using a digital trigger. For example, the control component 202 may transmit a signal including a digital trigger to a switch 218, which is an intermediate component that relays the digital trigger or responsively transmits a different digital trigger to the radar sensor 208. The switch 218 may, for example, transmit the digital trigger to the radar sensor 208 using a low-voltage differential signaling (LVDS) or Ethernet connection 220.

In another example, the control component 202 may cause the DVS 210 to produce DVS data by transmitting a signal including a digital trigger to the DVS. The control component 202 may, for example, transmit a digital trigger to the switch 218, which relays the digital trigger or responsively transmits a different digital trigger to the DVS 210. In another example, the control component 202 may cause the IMU 212 to produce IMU data by using a PPS signal to transmit a request therefor to the IMU 212.

The sensor data produced using the lidar sensor 204, the camera 206, the radar sensor 208, the DVS 210, and/or the IMU 212 may include measurements with respect to an event occurring with respect to the multi-sensor environment 200. For example, the lidar sensor 204 may produce lidar data indicating a distance to an object that is near the multi-sensor environment 200, whereas the camera 206 may produce camera data include an image of the object within a particular field of view for the multi-sensor environment 200. To optimize the likelihood that the measurements included in the produced sensor data refer to the same event or events, the control component 202 orchestrates the production of the sensor data based on a master time of the multi-sensor environment 200.

The control component 202 derives a master time from a master clock of the multi-sensor environment 200. The master clock is described above with respect to FIG. 1. The master clock may be reset upon an initialization of a battery-powered clock within the multi-sensor environment 200 (e.g., of the control component 202). The control component 202 may derive a then-current master time from the master clock, for example, by accessing the master clock, retrieving a timestamp from the master clock (e.g., based on a query thereto), or the like.

The control component 202 may use time information transmitted from a GPS component 222 to calibrate the master clock of the multi-sensor environment 200. The GPS component 222 may be time synchronized to a geolocation or like system external to the multi-sensor environment 200. For example, the GPS component 222 may access an atomic clock or other universal or global time keeping mechanism to obtain time information. The GPS component 222 may, for example, use PPS to transmit the time information to the control component 202 in an NMEA message. The control component 202 may determine a difference between the received time information and a then-current time according to the master clock. That difference may be stored in a log or other record or data store for later use, such as to synchronize later-received sensor data to the master clock when that sensor data is produced according to a GPS clock.

A sensor of the multi-sensor environment 200 derives a sensor time from a sensor clock. Each of the sensors uses a sensor clock to identify a time at which sensor data is produced. For example, each of the lidar sensor 204, the camera 206, the radar sensor 208, the DVS 210, and the IMU 212 may have its own sensor clock from which each derives a time at which it produces sensor data.

The sensor clocks of the sensors are not synchronized to the master clock of the multi-sensor environment 200. This may be because the sensors do not support clock synchronization; however, it may also or instead be due to latencies associated with ones of the sensors. A latency refers to an amount of time that elapses between when a signal is transmitted from the control component 202 to cause a sensor to produce sensor data and when the sensor data is produced based on an action performed by the sensor. The latency may be caused by time required for the signal to travel from the control component 202 to the sensor, time for the hardware and/or software associated with the sensor to initialize or otherwise perform the action for producing the sensor data, or the like, or a combination thereof. Table 1 shows examples of latencies associated with ones of the sensors of the multi-sensor environment 200 and the actions performed by those sensors to produce sensor data:

TABLE 1

| Sensor | Latency | Action |
| --- | --- | --- |
| Lidar | 10 µs | UDP packet build-up |
| Camera (visible) | 5 µs | Middle of exposure |
| Camera (infrared) | 7 µs | Frame readout |
| Radar | 3 ms | Middle of integration |
| DVS | 1 µs | Middle of frame |
| IMU | 250 µs | Sampled time |

As such, a visible-image camera is considered to produce camera data (e.g., an image) at the middle of an exposure time of the camera. There is a five microsecond latency for the visible-image camera to produce the camera data. Separately, a radar sensor is considered to produce radar data at the middle of an integration of a near scan (e.g., using a 90 degree field of view of the radar sensor at a close distance) and a far scan (e.g., using a 20 degree field of view of the radar sensor at a far distance). There is a three millisecond latency for the radar sensor to produce the radar data. As stated above, the values of the latencies shown in Table 1 are examples. In some cases, a latency associated with a sensor may be variable.

Figure 4:
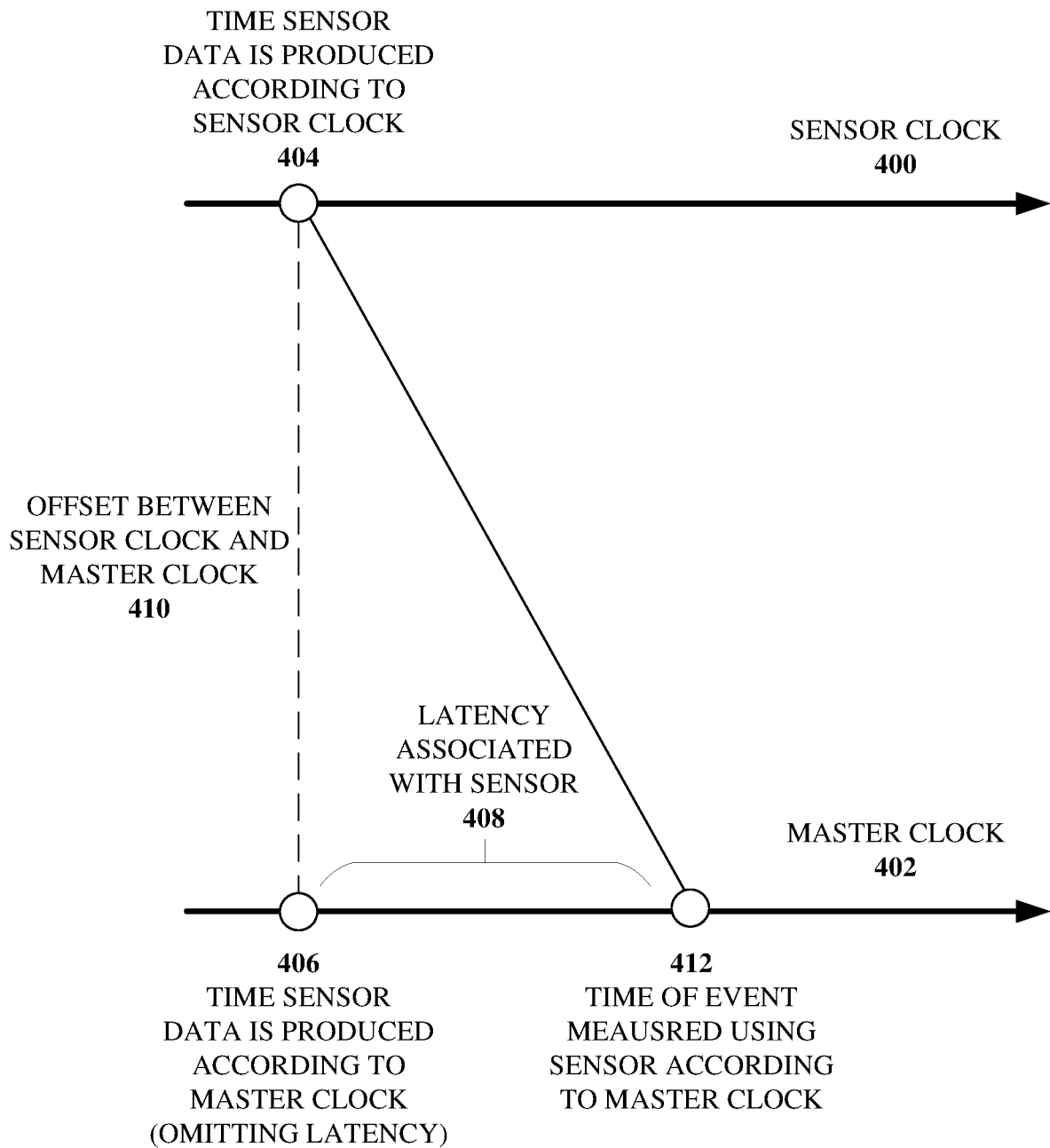
FIG. 4 is an illustration showing an example of time synchronization between a sensor time and a master time.

The control component 202 shares the master time to cause ones of the lidar sensor 204, the camera 206, the radar sensor 208, the DVS 210, and the IMU 212 to produce sensor data. In doing so, the sensor times at which sensor data is produced using those sensors are synchronized to master clock of the multi-sensor environment 200. In this way, a time according to the master clock at which sensor data is produced can be determined for each sensor data. This determined time according to the master clock is referred to as the master time for the sensor data. In some cases, the control component 202 can orchestrate the production of the sensor data by sending the master time to ones of the sensors of the multi-sensor environment 200 at particular times. In other cases, there may be a pre-configured event capture period for ones of those sensors. An example synchronization of a sensor time and a master time for sensor data is shown in FIG. 4, below.

As is described herein, the control component 202 can, for at least some sensors, derive the master time for sensor data it receives. For example, the control component 202 can receive a local sensor time from the sensor and convert it to the master time. However, in some cases, the control component 202 may not support deriving the master time for sensor data it receives. For example, the control component 202 may, for at least some sensors, receive a master time for the sensor data, which was converted from a local sensor time by the sensor that produced the sensor data (or a component associated with that sensor).

The manner for determining a time according to the master clock at which sensor data is produced, referred to as T, differs based on the sensor. For example, for sensor data produced using a camera, $T=A+B+(C/2)$, where A is the master time, B is the latency associated with the camera, and C is the total exposure time for the camera. In another example, for sensor data produced using a lidar sensor, $T=A+D$, where A is the master time and D is the time since the last PPS signal was transmitted to the lidar sensor. In yet another example, for sensor data produced using an IMU, $T=A+(E-F)$, where A is the master time, E is the time according to the sensor clock of the IMU at which the sensor data is transmitted from the IMU (e.g., by the control component 202), and F is the current time according to the master clock at which the sensor data is received from the IMU. Alternatively, the values of E and F may be represented in or as a joint pair. The above equations for determining T are examples. As such, equations other than those described above may be used to determine values of T for sensors of the multi-sensor environment 200.

The control component 202 derives a then-current master time as a threshold operation for causing a sensor to produce sensor data. The control component 202 then transmits a signal (e.g., using a PPS+NMEA signal, a PTP handshake, a CAN trigger, a TTL trigger, or the like), which signal may in some cases include the master time, to a sensor to cause it to produce the sensor data. Some of the sensors may include functionality for determining a time according to the master clock at which they produced sensor data using the master time transmitted from the control component 202. For such a sensor, the sensor receives the master time from the control component 202, determines a time according to its own sensor clock at which it produced sensor data, and then adjusts that time based on the master time to determine the master time at which it produced the sensor data.

For example, a signal transmitted to the camera 206 to cause it to produce camera data may include an indication of the master time (e.g., through gPTP to the microcontroller 216) and a digital trigger. The signal may be received by the computer 214 and processed in whole or in part using the microcontroller 216. The computer 214 determines a sensor time at which the camera produces the camera data (e.g., based on a middle time of the camera exposure). The computer 214 then determines a master time at which the camera data was produced based on the sensor time, the latency associated with the camera 206 (which latency is known by the computer 214), and the master time indicated in the signal transmitted from the control component 202. The computer 214 then transmits a signal indicating the master time for the camera data to the control component 202 (e.g., directly or indirectly, such as using the switch 218).

Alternatively, after deriving a then-current master time, the control component 202 may record, store, or otherwise maintain the then-current master time for later use. Some of the sensors may not include functionality for determining a time according to the master clock at which they produced sensor data. For such a sensor, the control component 202 transmits a signal (e.g., using a PPS signal, a digital trigger, a TTL trigger, or the like) to the sensor to cause the sensor to produce sensor data. The sensor then transmits back to the control component 202 a signal including the sensor data and a time at which the sensor data is produced according to a local clock of the sensor. The control component 202 uses the time included in the signal transmitted by the sensor to determine a master time at which the sensor data was produced.

For example, a signal transmitted to the lidar sensor 204 may include an NMEA message indicating the master time. The lidar sensor 204 derives the master time at a PPS edge using the NMEA message. The lidar sensor 204 can then produce a time stamp indicative of the sensor data it produced (which time stamp can correspond to the master time) and transmit the time stamp and the sensor data to the control component 202.

After the master times for the sensor data are determined, the control component 202 determines whether sensor data received from different ones of the sensors correspond to the same event. The control component 202 can compare the master times at which the different sensor data are produced to determine how close in time to one another they were produced. Sensor data producing using two or more different sensors can be considered to correspond to the same event when the master times at which each was produced are within a threshold amount of time of one another (e.g., five microseconds). Examples of techniques for time synchronization of sensor data produced using the sensors of the multi-sensor environment 200 are described below with respect to FIGS. 9 and 10.

Implementations of the multi-sensor environment 200 may differ from that which is shown and described. In some implementations, the control component 202 may be not be included in the multi-sensor environment 200. For example, the control component 202 may be a remote computing device in wireless communication with the sensors of the multi-sensor environment 200. In another example, the control component 202 may be external to the multi-sensor environment 200, but have control over a local component (not shown) that performs operations, such as to cause ones of the sensors to produce sensor data, based on instructions received from the control component 202.

In some implementations, the multi-sensor environment 200 may include one or more actuators that cause and control aspects of the sensors or the environment itself. For example, an actuator may include hardware and/or software for initializing the operation of a sensor, such as to begin producing sensor data or otherwise cause the sensor to produce sensor data. In another example, an actuator may include a mechanical actuator used in connection with the environment of the multi-sensor environment 200, such as motion actuators, propulsion actuators, suspension actuators, braking actuators, steering actuators, or the like, or a combination thereof.

The actuators may operate in response to control signals, such as may be transmitted from the control component 202 or another component of the multi-sensor environment 200. For example, the control component 202 may include functionality for causing motion of the multi-sensor environment 200. The control signals transmitted from the control component 202 to ones of the actuators may include instructions or the like for using the actuators to cause the motion. In some implementations, the functionality of the control component 202 to instruct or otherwise cause actuators to operate may be implemented in control software installed on or otherwise executed at the control component 202. For example, the control software may configure the control component 202 to enable autonomous motion of the multi-sensor environment 200.

In some implementations, one or more of the sensors or other components may be omitted and/or one or more other sensors or other components may be included. For example, implementations of the multi-sensor environment 200 may not include each of the lidar sensor 204, the camera 206, the radar sensor 208, the DVS 210, and the IMU 212. In another example, implementations of the multi-sensor environment 200 may include multiple lidar sensors, multiple cameras, multiple radars, multiple DVSs, and/or multiple IMUs. In yet another example, the GPS component 222 may be omitted.

In some implementations, the multi-sensor environment 200 may include multiple IMUs. For example, there may be a camera IMU, a DVS, or an IMU associated with another sensor of the multi-sensor environment 200. An IMU associated with a particular sensor may be configured to measure inertial motion applied against or otherwise with respect to that sensor.

In some implementations, the sensors of the multi-sensor environment 200 may all be connected to the control component 202 via Ethernet or like wired connection, whether directly or indirectly, such as through the switch 218. For example, the signals and triggers transmitted from the control component 202 may be transmitted over Ethernet cables where the interfaces of the sensors of the multi-sensor environment 200 include Ethernet ports.

In some implementations, an exposure time of the camera 206 may depend upon the shutter mechanism of the camera 206. For example, the camera 206 may use a global shutter mechanism that causes the exposure time to be at a fixed point in the shutter (e.g., sensor data-producing) process. In another example, the camera 206 may use a rolling shutter mechanism that causes the exposure time to be at different points in the shutter process, such as based on a readout time that delays the exposure time due to, for example, conditions of the environment in which the camera 206 is producing the sensor data. For example, the readout time may be longer in situations where there is too much or too little ambient light. The use of a global shutter mechanism may result in a fixed latency for the camera 206. However, the use of a rolling shutter mechanism may result in a variable latency for the camera 206. Multiple time stamps may be produced as a result of using a rolling shutter mechanism.

In some implementations, the control component 202 can record, store, or otherwise log all or a portion of sensor data produced using a sensor of the multi-sensor environment within a lookup table. For example, the control component 202 may store a sensor time and/or a master time of the sensor when it was used to produce the sensor data in connection with a portion of that sensor data. For example, where the sensor data is camera data, the sensor time and/or master time may be stored for one pixel of the image of the camera data. The lookup table may then reference the other pixels of that image to that sensor time and/or master time.

In some implementations, a GPS source that transmits timing information to the GPS component 222 can transmit that timing information to other GPS components located in other multi-sensor environments. For example, the GPS source can be used to synchronize the master clocks of multiple multi-sensor environments. In the event that sensor data is exported outside of a given multi-sensor environment, the timing of that sensor data may be usable with other multi-sensor environments. Similarly, that sensor data can be indicated in a data repository that is synchronized according to the master time and stores data received from multiple multi-sensor environments.

Figure 3:
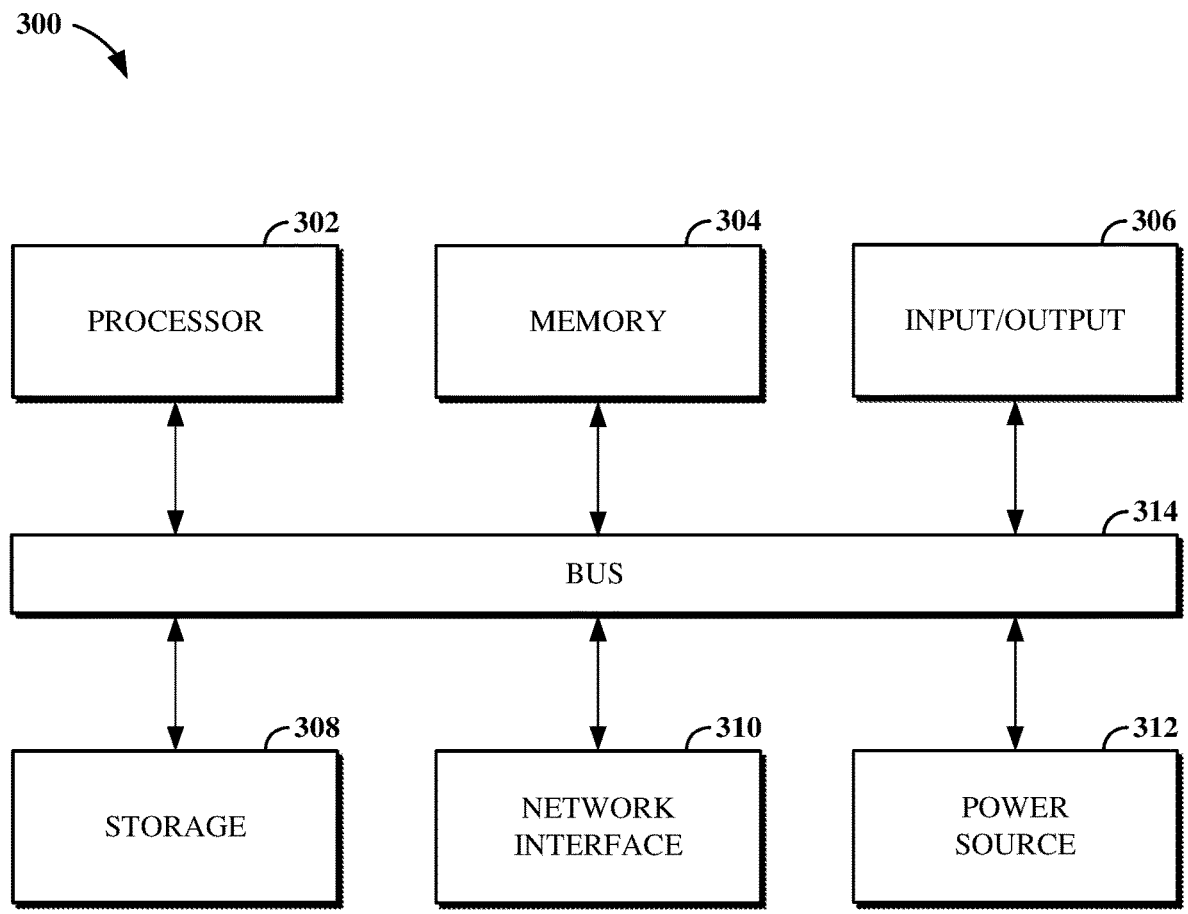
FIG. 3 is a block diagram showing an example of an internal configuration of a control component of a multi-sensor environment.

FIG. 3 is a block diagram showing an example of an internal configuration of a control component 300 of a multi-sensor environment. The control component 300 may, for example, be the control component 202 of the multi-sensor environment 200 shown in FIG. 2. The control component 300 includes a processor 302, a memory 304, one or more input/output devices 306, a storage device 308, a network interface 310, and a power source 312. The control component 300 also includes a bus 314 that interconnects one or more of the processor 302, the memory 304, the one or more input/output devices 306, the storage device 308, the network interface 310, or the power source 312.

The processor 302 is operable to execute computer program instructions and perform operations described by the computer program instructions. For example, the processor 302 may be a central processing unit or other device configured for manipulating or processing information. The processor 302 may include one or more single- or multi-core processors. The memory 304 may be a volatile, high-speed, short-term information storage device such as a random-access memory module. The memory 304 may include data for immediate access by the processor 302, for example, computer program instructions executable by the processor 302.

The one or more input/output devices 306 may include one or more input devices and/or one or more output devices. Examples of input devices include a button, a switch, a keyboard, a mouse, a touchscreen input device, a gestural input device, or an audio input device. Examples of output devices include a display screen or an audio output. The storage device 308 may be a non-volatile information storage device such as a disk drive, a solid state drive, a flash memory device, or another device configured for persistent electronic information storage.

The network interface 310 includes a physical or virtual connection to a network, such as the Internet, a local area network, a wide area network, or another public or private network. For example, the network interface 310 may include an Ethernet port, a wireless network module, or the like, or a combination thereof. The network interface 310 may be used to transmit data to or received data from one or more sensors in communication with the control component 300 (e.g., within the multi-sensor environment 200 shown in FIG. 2). The power source 312 includes a source for providing power to the control component 300. For example, the power source 312 may be a battery. In another example, the power source 312 may be or otherwise include an interface to a power system external to the control component 300.

Implementations of the control component 300 may differ from that which is shown and described. In some implementations, the one or more input/output devices 306 may include a data port for connecting the control component 300 to another computing device. For example, the other computing device can transmit instructions to update or otherwise modify functionality of the control component 300 to the control component 300. In another example, the control component 300 can transmit logs or other records of data measured or otherwise produced using one or more sensors in communication with the control component 300 to the other computing device.

FIG. 4 is an illustration showing an example of time synchronization between a sensor time and a master time. The sensor time reflects a time according to a sensor clock 400 associated with a sensor of a multi-sensor environment, for example, the multi-sensor environment 200 shown in FIG. 2. The master time reflects a time according to a master clock 402 available to a component of the multi-sensor environment, for example, the control component 202 shown in FIG. 2.

Time 404 reflects a time that sensor data is produced according to the sensor clock 400. For example, the time 404 may be a sensor time indicated by the sensor clock of the sensor used to produce the sensor data. Time 406 reflects a time that the sensor data is produced according to the master clock 402 omitting a latency 408 associated with the sensor. For example, the time 406 may represent the master time for the sensor data if the latency 408 did not affect the synchronization of the time 404 to the master clock 402. An offset 410 shows a time difference between the time 404 and the time 406, which, for example, can be due to the sensor clock 400 not being synchronized to the master clock 402. Time 412 reflects a time according to the master clock 402 at which an event measured by the sensor data is determined to have occurred.

Figure 5:
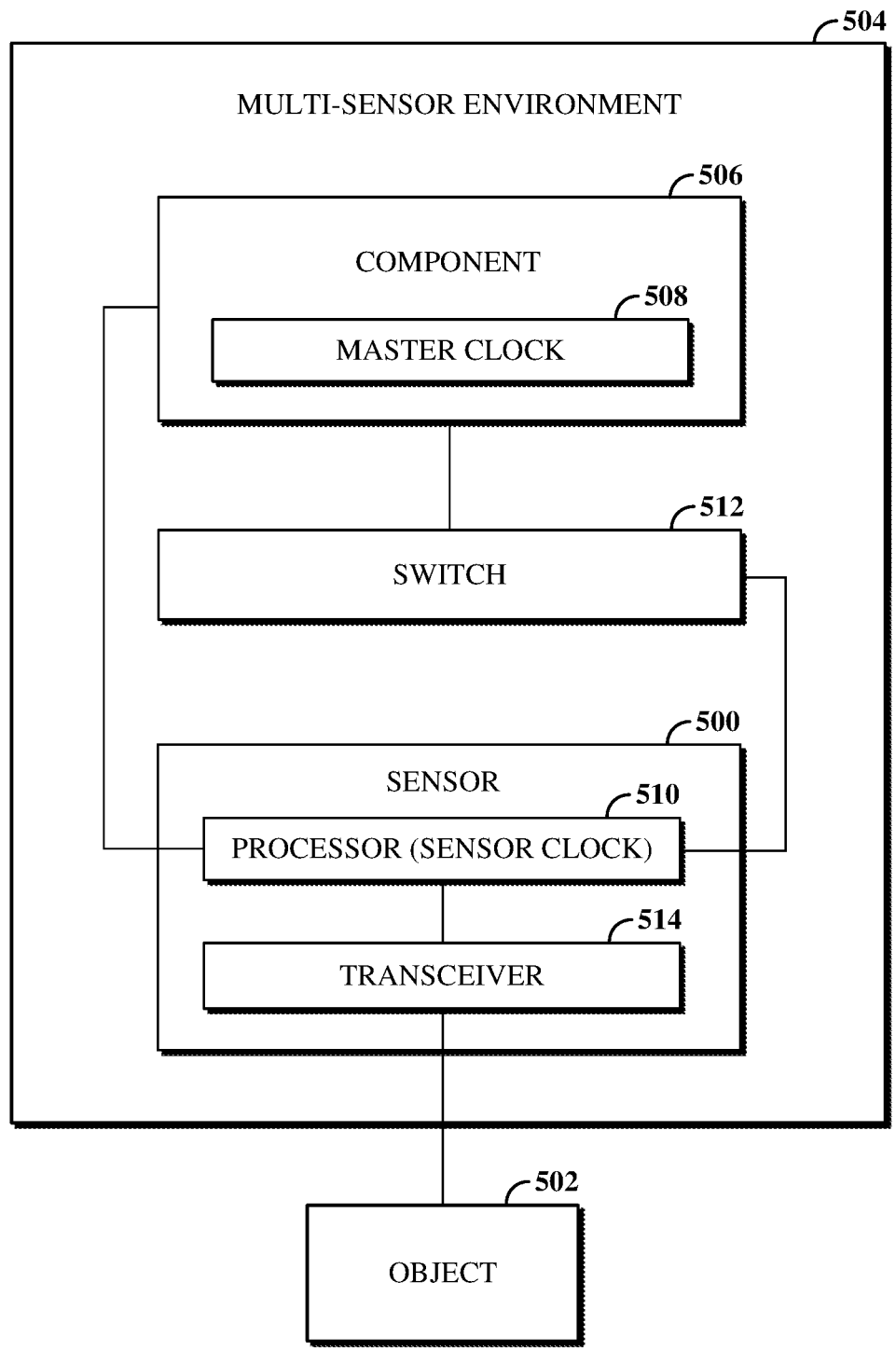
FIG. 5 is a block diagram showing an example of a sensor that produces sensor data on a periodic basis.

FIG. 5 is a block diagram showing an example of a sensor 500 that produces sensor data on a periodic basis. The sensor 500 may be a sensor that receives a PPS signal or like signal on a periodic basis, for example, a lidar sensor, an IMU, or the like. The sensor 500 produces sensor data with respect to an object 502 that is external to a multi-sensor environment 504, which multi-sensor environment 504 includes the sensor 500. The multi-sensor environment 504 may, for example, be the multi-sensor environment 200 shown in FIG. 2.

The multi-sensor environment 504 includes a component 506 that derives a master time of the multi-sensor environment 504 from a master clock 508. The component 506 may, for example, be the control component 202 shown in FIG. 2. The component 506 includes functionality for transmitting a signal to the sensor 500 to cause the sensor 500 to produce sensor data. For example, the component 506 can transmit a PPS signal directly to the sensor 500, which PPS signal is received by a processor 510 of the sensor 500. In another example, the component 506 can transmit a PPS signal indirectly to the sensor 500, such as using a switch 512 intermediate with respect to the component 506 and the processor 510.

Subsequent to receiving the PPS signal transmitted from the component 506, the processor 510 instructs a transceiver 514 of the sensor 500 to measure an event with respect to the multi-sensor environment 504. The object 502 is detected as a result of the measuring using the transceiver 514. Sensor data is produced based on the measuring using the transceiver 514, which sensor data reflects information about the object 502. The processor 510, which has access to a sensor clock of the sensor 500, determines the sensor time at which the sensor data was produced. The processor 510 then transmits the sensor data and the sensor time at which the sensor data was produced to the component 506, either directly or indirectly, such as using the switch 512.

For example, where the sensor 500 is a lidar sensor, the component 506 can transmit a PPS signal to cause the lidar sensor to produce sensor data indicative of a distance between the sensor 500 (and, therefore, the multi-sensor environment 504) and the object 502. For example, the component 506 can cause the lidar sensor to produce the sensor data by transmitting an indication of the master time to the lidar sensor, such as using a PPS+NMEA signal. The sensor data is produced in response to the transceiver 514 measuring the distance to the object 502, such as using one or more lasers. The sensor data is produced at a sensor time according to a sensor clock of the sensor 500, which sensor time is measured using the processor 510. The sensor 500 can convert the sensor time to the master time, such as based on a latency of the sensor 500, and transmit the converted time to the component 506. For example, the sensor 500, using the processor 510, can transmit an NMEA string indicative of the converted master time at which the sensor data was produced. Alternatively, the sensor data may be transmitted to the component 506 using the processor 510, along with an indication of the sensor time at which the sensor data was produced. For example, the sensor 500, using the processor 510, can transmit an NMEA string indicative of the sensor time at which the sensor data was produced.

Figure 6:
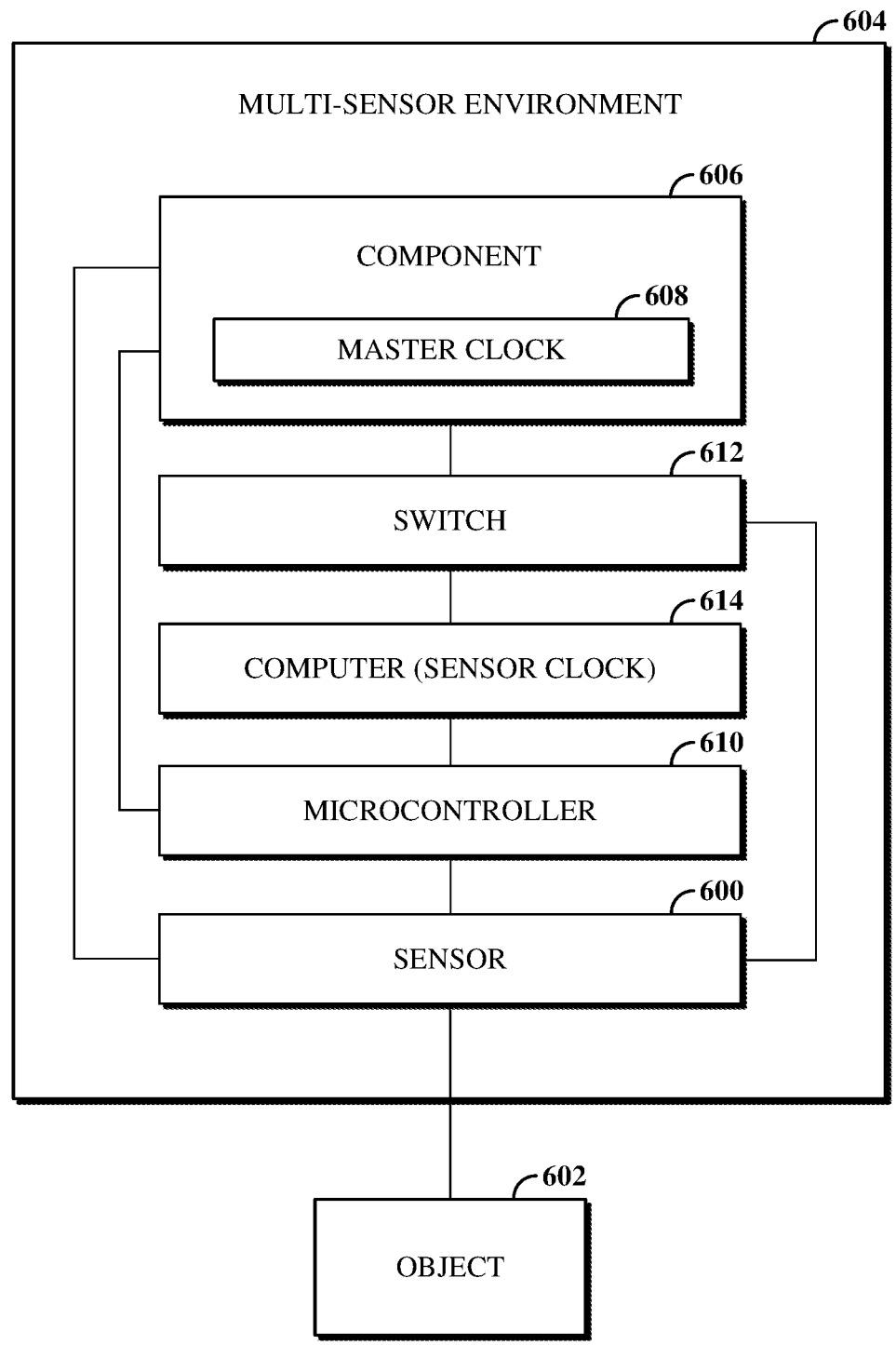
FIG. 6 is a block diagram showing an example of a sensor that produces sensor data based on a trigger.

FIG. 6 is a block diagram showing an example of a sensor 600 that produces sensor data based on a trigger. The sensor 600 may be a sensor that receives a signal including a trigger, for example, a camera, a radar sensor, a DVS, or the like. The sensor 600 produces sensor data with respect to an object 602 that is external to a multi-sensor environment 604, which multi-sensor environment 604 includes the sensor 600. The multi-sensor environment 604 may, for example, be the multi-sensor environment 200 shown in FIG. 2.

The multi-sensor environment 604 includes a component 606 that derives a master time of the multi-sensor environment 604 from a master clock 608. The component 606 may, for example, be the control component 202 shown in FIG. 2. The component 606 includes functionality for transmitting a signal including a trigger to the sensor 600 to cause the sensor 600 to produce sensor data. For example, the component 606 can transmit a digital signal directly to the sensor 600 (e.g., to a processor of the sensor 600), to a microcontroller 610 external to the sensor 600 and which is configured to instruct the sensor 600 to produce sensor data.

Based on the trigger transmitted from the component 606, the sensor 600 performs one or more operations to measure an event with respect to the multi-sensor environment 604. The object 602 is detected, and sensor data reflecting information about the object 602 is produced, as a result of the measuring using the sensor 600. The sensor 600, for example, using the computer 614 that has access to a sensor clock of the sensor 600, determines the sensor time at which the sensor data was produced. The sensor 600, for example, using the computer 614, may also adjust the sensor time according to a latency associated with the sensor 600. The sensor 600 then transmits the sensor data and the sensor time to the component 606, either directly or indirectly, such as using the switch 612.

For example, where the sensor 600 is a camera, the component 606 can transmit a signal indicating the master time and including a digital trigger to cause the camera to produce sensor data based on (e.g., an image of) the object 602. The digital trigger is received by the computer 614 through the switch 612. The microcontroller 610 receives a master time through PTP transactions. The sensor data is produced based on the digital trigger at a sensor time according to a sensor clock measured using the computer 614. The computer 614 uses the sensor time, the master time indicated in the signal transmitted from the component 606, and a latency associated with the camera to determine a master time according to the master clock 608 at which the sensor data was produced. The sensor data is then transmitted to the component 606 using the switch 612, along with an indication of the master time of the sensor data.

In another example, where the sensor 600 is a DVS, the computer 614 may be an FPGA or other specialized hardware included in the DVS. The microcontroller 610 may be omitted or included as part of the DVS. For example, the microcontroller 610 may be omitted where the sensor 600 includes functionality for deriving the master time through gPTP transactions. In yet another example, where the sensor 600 is a radar sensor, the computer 614 may be omitted. The microcontroller 610 may be an Ethernet dongle connecting the radar sensor to the switch 612.

Figure 7:
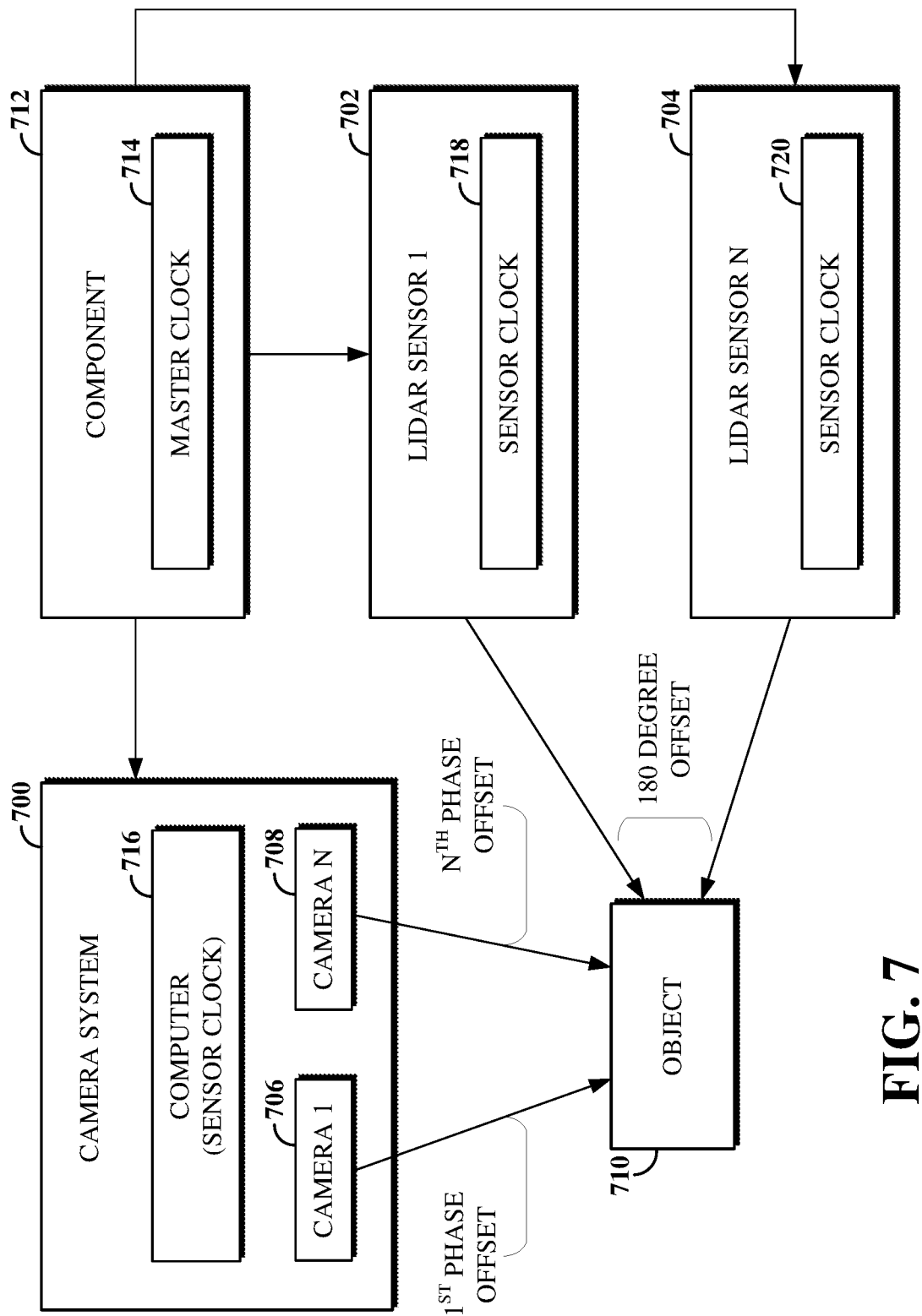
FIG. 7 is an illustration showing an example of time synchronization of sensor data produced using multiple sensors.

FIG. 7 is an illustration showing an example of time synchronization of sensor data produced using multiple sensors. In particular, the illustration shows a system including a camera system 700 and lidar sensors 702, 704. The camera system includes cameras 706, 708. The system can represent all or a portion of a multi-sensor environment, for example, the multi-sensor environment 200 shown in FIG. 2. The lidar sensors 702 and 704 represent $1^{st}$ and $N^{th}$ lidar sensors, respectively, of the system. Similarly, the cameras 706 and 708 represent $1^{st}$ and $N^{th}$ cameras, respectively, of the system. The $N^{th}$ lidar sensor 704 or the $N^{th}$ camera 708 may represent the $2^{nd}$, $3^{rd}$, $4^{th}$, or other lidar sensor or camera, respectively, included in the system. As such, although two lidar sensors 702, 704 and two cameras 706, 708 are shown, other numbers of lidar sensors and/or cameras may be used.

The lidar sensors 702, 704 and the cameras 706, 708 produce sensor data by measuring an event associated with an object 710. The lidar sensors 702, 704 and the cameras 706, 708 produce the sensor data based on signals received from a component 712, which signals cause the production of the sensor data. The component 712 is a component including functionality for transmitting signals to cause sensors to produce sensor data, for example, the control component 202 shown in FIG. 2. The component 712 measures a master time of the system from a master clock 714. The component 712 may indicate the master time to ones of the sensors of the system (e.g., the lidar sensors 702, 704 and/or the cameras 706, 708) using the signals transmitted thereto.

The camera system 700 includes a computer 716 that receives signals transmitted to the cameras 706, 708 from the component 712. Based on those signals, the computer 716 can send instructions to a microcontroller (not shown) of the camera system 700, which controls an order in which the cameras 706 and 708 produce sensor data and timing therefor based on a trigger input received from the component 712. For example, the microcontroller can cause the camera 706 to produce sensor data at a $1^{st}$ phase offset and cause the camera 708 to produce sensor data at an $N^{th}$ phase offset, where a phase offset represents a delayed performance of the action(s) resulting in the production of the sensor data (e.g., the opening of a camera shutter and mid-exposure thereof).

The computer 716 or the microcontroller of the camera system 700 may configure the phase offsets for the cameras 706, 708 according to signals transmitted from one or both of the lidar sensors 702, 704 to the component 712. For example, the $1^{st}$ camera 706 may be instructed to delay the production of sensor data by an amount of time (e.g., the time of the $1^{st}$ phase offset). The $N^{th}$ camera 708 may be instructed to delay the production of sensor data by a larger amount of time (e.g., the time of the $N^{th}$ phase offset). In this way, the triggers for causing the cameras 706, 708 to produce sensor data are synchronized (e.g., phase-locked) to PPS signals transmitted to the lidar sensors 702, 704. As a result, the camera data produced using a particular camera is synchronized to a portion of the lidar data produced using a particular lidar sensor.

The computer 716 or the microcontroller of the cameras system 700 may determine the phase offsets for respective ones of the cameras 706, 708 based on angles of the lidar sensors 702, 704. For example, PPS signals may be transmitted to the lidar sensors 702, 704 at a master time according to the master clock 714. The lidar sensors 702, 704 may responsively transmit signals to the component 712 including lidar data produced using the lidar sensors 702, 704.

The lidar data produced using one of the lidar sensors 702, 704 indicates an angle of that lidar sensor and a sensor time of that lidar sensor when the sensor data was produced. The lidar data, which may, for example, be transmitted as a UDP packet, can be used to determine when the lidar sensor will be rotated in a certain direction next. For example, based on the rotation speed of a lidar sensor (e.g., 10 Hz), the lidar data can be used to determine a master time at which the lidar sensor will be angled 0 degrees, 90 degrees, 180 degrees, or 270 degrees with respect to an aspect of the multi-sensor environment (e.g., a front side thereof) or a field of view of another sensor (e.g., a visible-light camera). Determining when a lidar sensor will be angled 0 degrees, 90 degrees, 180 degrees, or 270 degrees with respect to an aspect of the multi-sensor environment helps to reduce interference between lidar sensors of the multi-sensor environment. Thus, while other numbers of degrees may be used, the particular selection of 0 degrees, 90 degrees, 180 degrees, and/or 270 degrees may mitigate lidar sensor interference.

For example, the multi-sensor environment may include a camera having a field of view corresponding to each of those lidar sensor angles. The component 712 can therefore cause those cameras to produce sensor data based on the angles of the lidar sensor reported in the lidar data. For example, the component 712 can receive a UDP packet from the lidar sensor 702 indicating that the lidar sensor 702 was angled at 270 degrees with respect to the camera 706 and 180 degrees with respect to the camera 708.

The component 712 may then transmit a signal to the camera system 700 including a trigger input for aligning a mid-exposure of the camera 706 to a next production of sensor data using the lidar sensor 702 (e.g., by timing the production of sensor data using the camera 706 to a 1st offset) and a mid-exposure of the camera 708 to a second-to-next production of sensor data using the lidar sensor 702 (e.g., by timing the production of sensor data using the camera 708 to a 2nd offset). Alternatively, the component 712 may transmit a signal including the UDP packet received from the lidar sensor 702 to the camera system 700. The camera system 700 may then use the data included in the UDP packet to determine the trigger input for aligning the mid-exposures of the cameras 706 and 708. The signals transmitted to the cameras 706, 708 from the component 712 may therefore be transmitted at approximately the master time or at a time representative of a phase offset from the master time.

The trigger input transmitted from the component 712 to the camera system 700 may be calculated based on a rotation time of the lidar sensor 702. For example, the rotation time, R, may be calculated as $R=(360/(\Phi_{n+1}-\Phi_n))*(t_{n+1}-t_n)$, where t represents the time at which the lidar sensor produced lidar data and $\Phi$ represents the angle of the lidar sensor when it produced the lidar data. The time at which the lidar sensor will be angled in a particular direction, $t_x$, may therefore be calculated as $t_x=t_n+((R*(360-\Phi_n))/360)$. The calculations may be particularly useful where the speed of the camera trigger (e.g., 20 Hz) is not the same as the rotation speed of the lidar sensor.

The cameras 706, 708 may be triggered according to angles predicted based on lidar data produced using the lidar sensor 702 and/or the lidar sensor 704, such as based on a rotational offset of the lidar sensors 702, 704. A rotational offset of the lidar sensors 702, 704 may, for example, be 180 degrees such that the angles of the lidar sensors 702, 704 when producing the sensor data were 180 degrees apart. As a result of this timing, mid-exposures of the cameras 706, 708 may be timed according to the phase offsets and based on the angles of the lidar sensors 702, 704.

The component 712 can thus receive the sensor data produced using each of the lidar sensors 702, 704 and the cameras 706, 708. The component 712 can also receive sensor times at which those sensors produced their respective sensor data or master times of those sensor data. For example, the lidar sensors 702, 704 can transmit sensor times according to sensor clocks 718, 720 to the component 712. The component 712 can map those sensor times to the master clock 714, such as based on latencies associated with the lidar sensors 702, 704, to determine master times according to the master clock 714 at which the lidar sensors 702, 704 produced the sensor data.

In another example, the computer 716 that measures a sensor time of the camera system 700 can determine the sensor times at which the cameras 706, 708 produced the sensor data. The computer 716 can then determine master times according to the master clock 714 at which the sensor data was produced based on the determined sensor times, the latencies associated with the cameras 706, 708, and the master time indicated in the signals transmitted to the cameras 706, 708 from the component 712, which signals caused the production of the sensor data using the cameras 706, 708.

The component 712 can then determine whether the sensor data produced using the lidar sensors 702, 704 and the cameras 706, 708 correspond to one another, such as based on the master times at which each of the sensor data were produced. For example, the sensor data produced using the lidar sensor 702 may correspond to the sensor data produced using the cameras 706 and 708 where the master times associated with the three sensor data are within a threshold amount of time of one another. If the master times are within the threshold amount of time of one another, or if the sensor data produced using multiple ones of the lidar sensors 702, 704 and/or the cameras 706, 708 are determined to correspond to one another, those sensor data can be associated with an event occurring with respect to the system. In another example, the sensor data produced using the lidar sensor 702 may be determined to correspond to the sensor data produced using the cameras 706 and 708 based on one or more metrics against which those sensor data are measured. For example, the times at which the sensor data are produced can be measured within a sliding window that is based on one or more geometric, kinematic, dynamic, or like metrics.

Although the system is shown and described as including lidar sensors and cameras, other sensors may be included instead of or in addition those sensors. For example, the system may include one or more radar sensors in place of the cameras. The radar sensors may be configured to produce sensor data based on a timing of signals transmitted from the component 712 to the lidar sensors 702, 704. For example, a radar sensor may be triggered to produce radar data when a field of view of the radar sensor overlaps with a field of view of a lidar sensor. The angle of the lidar sensor can be predicted, such as described above. Where multiple radar sensors are included in the multi-sensor environment, the radar sensors may be triggered based on phase offsets, such as described above with respect to the cameras 706, 708.

Figure 8:
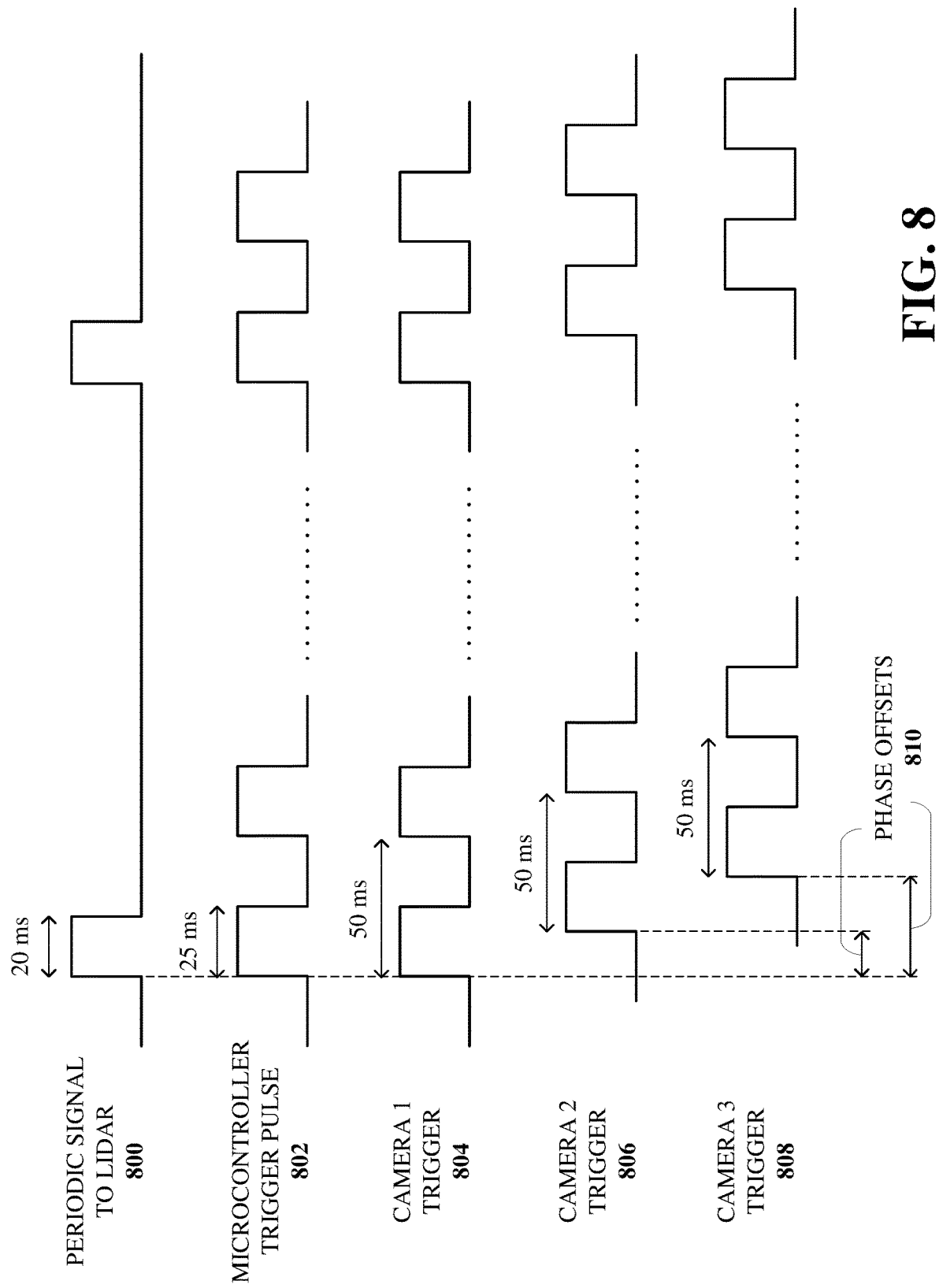
FIG. 8 is an illustration showing an example of timings of operations of multiple sensors.

FIG. 8 is an illustration showing an example of timings of operations of multiple sensors. By way of example, the timings shown reflect signals and triggers to the sensors shown in the system of FIG. 7, namely, lidar sensors and cameras. A periodic signal 800 having a width of 20 milliseconds is transmitted to a lidar sensor at a master time of a multi-sensor environment that includes the lidar sensor (e.g., the multi-sensor environment 200 shown in FIG. 2). Also at the master time (or approximately at the master time, e.g., subject to latency inherent in the system), a trigger pulse 802 is transmitted to a microcontroller associated with a camera system. The trigger pulse has a width of 25 milliseconds. The microcontroller is a frame grabber that controls the capturing of images by first, second, and third cameras of the multi-sensor environment.

The microcontroller sends a trigger 804 to cause the first camera to capture an image at the master time (e.g., without a phase offset). The microcontroller sends a trigger 806 to cause the second camera to capture an image at a first phase offset. The microcontroller sends a trigger 808 to cause the third camera to capture an image at a second phase offset. Each of the triggers 804, 806, 808 has a width of 50 milliseconds. The first phase offset and the second phase offset are shown as phase offsets 810. The first phase offset represents the time delay between the trigger 804 and the trigger 806. The second phase offset represents the time delay between the trigger 806 and the trigger 808. Alternatively, the time at which the microcontroller sends the trigger 804 to the first camera can be considered the first phase offset. The times at which the microcontroller sends the trigger 806 to the second camera and the trigger 808 to the third camera would respectively thus be the second and third phase offsets.

The phase offsets 810 may, for example, represent times corresponding to an angle of the lidar sensor. Lidar data received from the lidar sensor may be used to predict a time at which an angle of the lidar sensor will align with a mid-exposure of each of the cameras. For example, the lidar data may be used to calculate a rotation time for the lidar sensor, which can then be used to predict a time according to a master clock at which the lidar sensor will be aligned within the respective mid-exposures of the cameras. A computer or microcontroller may thus cause the triggers 804, 806, and 808 to align with the times at which the lidar sensor will be so angled.

Figure 9:
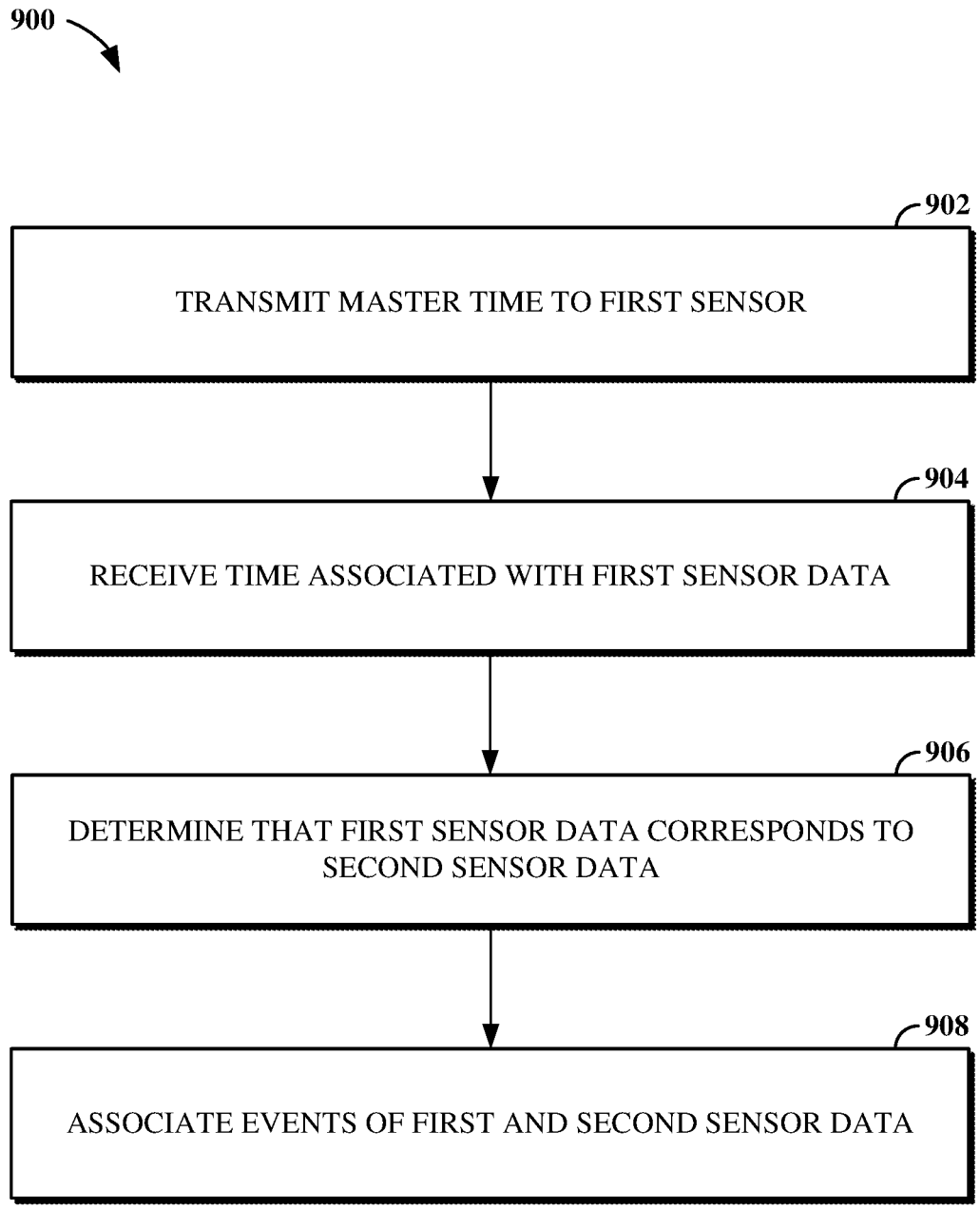
FIG. 9 is flowchart showing an example of a first technique for time synchronization of sensor data.
Figure 10:
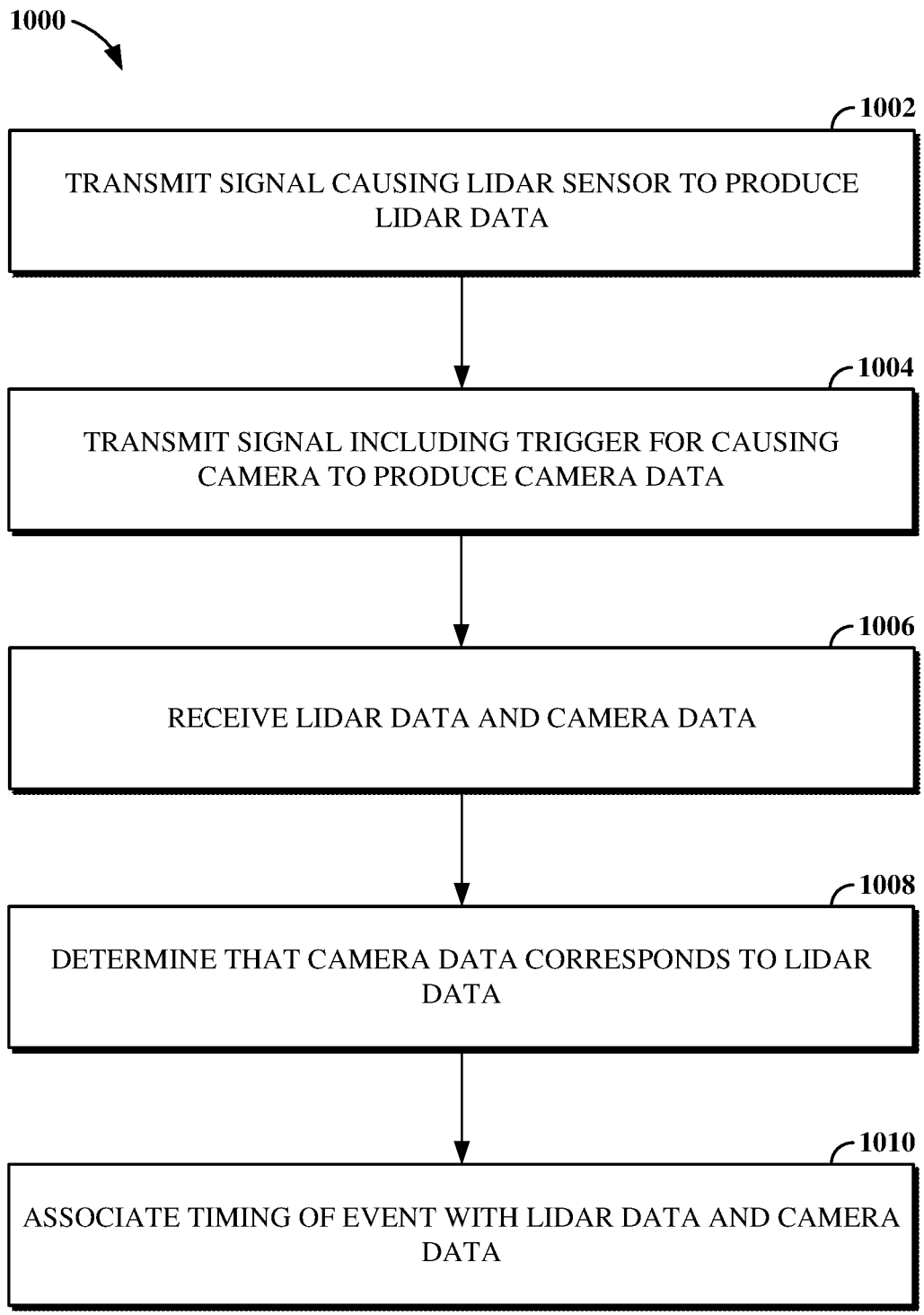
FIG. 10 is flowchart showing an example of a second technique for time synchronization of sensor data.

FIG. 9 is flowchart showing an example of a first technique 900 for time synchronization of sensor data. FIG. 10 is flowchart showing an example of a second technique 1000 for time synchronization of sensor data. The first technique 900 and/or the second technique 1000 can be executed using a computing device such as one or more processors that execute instruction that are stored in memory. In some implementation, a multi-sensor environment (e.g., the multi-sensor environment 200 shown in FIG. 2) can be used to implement the first technique 900 and/or the second technique 1000, including use of signals transmitted to and received from sensors of the multi-sensor environment and processing by a control component associated therewith. In some implementations, the first technique 900 and/or the second technique 1000 can be implemented directly in hardware, firmware, or software, circuitry, or the like, or a combination thereof. The first technique 900 and the second technique 1000 are examples of techniques for time synchronization of sensor data. Other techniques may also or instead be used for time synchronization of sensor data.

Referring first to the first technique 900 shown in FIG. 9, at 902, a component that derives a master time of a multi-sensor environment transmits a signal to a first sensor of the multi-sensor environment. The first signal indicates the master time. The master time reflects a time according to a master clock of the multi-sensor environment. The signal transmitted to the first sensor is transmitted at the master time. The component that transmits the signal to the first sensor may, for example, be the control component 202 shown in FIG. 2. The multi-sensor environment may, for example, be the multi-sensor environment 200 shown in FIG. 2. In some cases, the first signal may also include a trigger for causing the first sensor to produce first sensor data.

At 904, the component receives a signal from the first sensor. The signal received from the first sensor indicates a first time determined by the first sensor based on the master time and a latency associated with the first sensor. The first time indicates a time of an event associated with the first sensor data according to the master clock of the multi-sensor environment. The signal received from the first sensor further includes the first sensor data produced using the first sensor. The first time can be determined by a computer, microcontroller, or other hardware or software component associated with the first sensor. For example, a computer associated with the first sensor can determine the first time based on a sensor time at which the first sensor produced the first sensor data, the master time indicated in the signal transmitted from the component, and the latency associated with the first sensor.

The latency associated with the first sensor can be fixed such that it does not change. Alternatively, the latency associated with the first sensor can be variable such that it might change. For example, a variable latency may change based on a condition associated with the multi-sensor environment, such as an amount of light or other ambience to which the multi-sensor environment is exposed. In another example, a variable latency may change based on a configuration of the sensor with which the variable latency is associated, such as a setting of the sensor for controlling how it produces sensor data or an integration time for the sensor. For example, a camera that has variable latency may have an exposure time that varies between 300 microseconds to 100 milliseconds. In another example, the latency associated with a radar sensor may be conditioned upon a prior constant determined before the radar is used to produce sensor data.

At 906, a determination is made that the first sensor data corresponds to second sensor data produced using a second sensor of the multi-sensor environment. The determination is made based on the first time and a second time indicating a time of an event associated with the second sensor data. For example, determining that the first sensor data corresponds to the second sensor data can include determining that a difference between the first time and the second time is less than a threshold. In another example, the first sensor data may be determined to correspond to the second sensor data based on one or more metrics. For example, the times at which the first and second sensor data are produced can be measured within a sliding window that is based on one or more geometric, kinematic, dynamic, or like metrics.

To produce the second sensor data, the component can transmit a signal to the second sensor at the same master time at which the signal was transmitted to the first sensor or at a phase offset according to that same master time. The signal transmitted to the second sensor causes the second sensor to produce the second sensor data. The component subsequently receives a signal from the second sensor indicating a sensor time at which an event associated with the sensor data occurred (e.g., a sensor time at which the second sensor data is produced), which sensor time corresponds to a sensor clock of the second sensor. The signal received from the second sensor further includes the second sensor data.

The component can determine the second time according to the master clock of the multi-sensor environment based on the sensor time of the second sensor data and a latency associated with the second sensor. For example, the component may have access to a table, database, or other data store or record indicating the latency associated with the second sensor. The component can use that latency, the sensor time of then second sensor data, and the master time indicated in the signal transmitted to the second sensor to determine a time according to the master clock at which the second sensor data was produced.

The trigger for causing the first sensor to produce the first sensor data may be synchronized (e.g., phase-locked) to a signal (e.g., a PPS signal) defining a periodic basis for producing the second sensor data using the second sensor. For example, the first sensor may include a camera and the second sensor may include a lidar sensor. The lidar sensor can be signaled to produce the first sensor data using a PPS signal transmitted from the component. The trigger for causing the camera to produce the second sensor data may be offset based on the PPS signal. Alternatively, the trigger for causing the camera to produce the second sensor data may be offset based on an angle of the lidar sensor.

Determining whether the difference between the first time and the second time is less than the threshold may, for example, include comparing timestamps generated for the first sensor data and the second sensor data. Alternatively, the determining may include querying a list, database, data store, or other source for, or otherwise identifying, sensor data produced within a threshold period of time from one of the first sensor data or the second sensor data. For example, a search can be performed for sensor data produced within five microseconds of the first sensor data. The search may, for example, be performed by the component that transmitted the signal to the first sensor.

For example, identifiers can be associated with signals received by the component, such as from ones of the sensors of the multi-sensor environment subsequent to those sensors being used to produce sensor data. An identifier can represent sensor data produced using one sensor at one given time or multiple sensor data produced using multiple sensors and/or at multiple times. The identifiers can be generated at fixed intervals (e.g., where the sensor data is produced at fixed intervals) or otherwise. The identifier may, for example, be an integer, a character string, or the like.

At 908, subsequent to determining that the first sensor data corresponds to the second sensor data, the event associated with the first sensor data and the event associated with the second sensor data are associated with one another. For example, determining that the first sensor data corresponds to the second sensor data includes determining that the first sensor and the second sensor measured aspects of the same event within the first sensor data and the second sensor data, respectively.

Associating the events can include generating a timestamp to represent the time according to the master clock at which both of the first sensor data and the second sensor data occurred. For example, the timestamp can represent an average of the first time and the second time. Alternatively, associating the events can include indicating that the first sensor data and the second sensor data both measure the same event. For example, the component that transmitted the signals to the first sensor and the second sensor can store a record of an event within a database or other data store. The record can reflect that the event is measured using the first sensor data and the second sensor data. As a further alternative, associating the events can include combining or otherwise incorporating the kinematic, dynamic, or other measurements of the first sensor data and second sensor data.

In some implementations, the first technique 900 may include adjusting at least one of the first time or the second time according to the latencies associated with the first sensor and the second sensor. Subsequent to the adjusting, the first time and the second time would thus reflect times according to the master clock. For example, the signal transmitted from the first signal to the component may indicate the sensor time at which the first sensor data is produced (e.g., according to a sensor clock of the first sensor) instead of the first time that is according to the master clock. The component can adjust the sensor time transmitted from the first sensor according to a latency associated with the first sensor. In some implementations, the first technique 900 may include adjusting at least one of the first time or the second time according to a skew associated with the first sensor or the second sensor.

In some implementations, the second time transmitted from the second sensor may reflect a time according to the master clock. For example, the first time and the second time respectively received from the first sensor and the second sensor may both reflect times according to the master clock at which the first sensor data and the second sensor data, respectively, were produced. In such an implementation, determining that the first sensor data and the second sensor data correspond to one another would thus include comparing the first time and the second time.

In some implementations, a signal received from a sensor may include the latency associated with that sensor. For example, the component may not have access to the latencies associated with the sensors. In such a case, responsive to receiving a signal from the component that causes the sensor to produce sensor data, the sensor can send the produced sensor data, the time at which the sensor data is produced, and the latency associated with the sensor back to the component. In another example, the component may use the latency received from the sensor to verify that the latency the component identified as being associated with the sensor is correct. In yet another example, the component may record, store, or otherwise log the latency received from the sensor, such as to determine whether it changes over time.

In some implementations, the component may not transmit the master time to a sensor. For example, the component may transmit a signal including a PPS signal to cause the sensor to produce sensor data without indicating the master time. The component may instead device the master time at which it sent the signal to the sensor and record, store, or otherwise log that master time for later use. The sensor can respond to the component by transmitting a signal including the sensor time at which it produced the sensor data according to its sensor clock. The component can use the previously-derived master time and the sensor time received from the sensor to determine the time according to the master clock at which the sensor data was produced.

In some implementations, the first technique 900 may be practiced with respect to actuators associated with the sensors of the multi-sensor environment. For example, the first technique 900 can include transmitting data to and receiving data from the actuators (e.g., hardware and/or software associated therewith) instead of or in addition to the transmitting of data to and receiving of data from sensors as described above.

In some implementations, the first technique 900 may include associating one or more of the first sensor data or the second sensor data with other sensor data. For example, the other sensor data may be produced at a time before or after the first sensor data and the second sensor data. The associating can thus indicate that a given event is being sensed over a period of time. In another example, the other sensor data may include sensor data produced using a different plurality of sensors, such as at the same or a substantially similar time as the first time and the second time.

In some implementations, the first technique 900 can omit the associating at 908. For example, the operations for transmitting the master time at 902, receiving the time associated with the first sensor data at 904, and determining that the first sensor data corresponds to the second sensor data may be performed separately from the operations for associating the events at 908. For example, the operations at 902, 904, and 906 may be performed as part of a live system for a multi-sensor environment, and the operations at 908 may be performed as part of backend processing for the multi-sensor environment.

Referring next to the second technique 1000 shown in FIG. 10, at 1002, a first signal is transmitted to a lidar sensor of a multi-sensor environment at a master time according to a master clock of the multi-sensor environment. The first signal causes the lidar sensor to produce lidar data indicative of a distance to an object at a lidar time. The first signal may, for example, include a PPS signal. At 1004, a second signal is transmitted to a camera of the multi-sensor environment at a time representative of a phase offset from the master time. The second signal includes a trigger for causing the camera to produce camera data at a camera time. The first signal and the second signal may be transmitted using a component of the system, for example, the control component 202 shown in FIG. 2.

The first signal includes a PPS signal or like signal defining a periodic basis for producing the lidar data using the lidar sensor. The trigger for causing the camera to produce the camera data is synchronized (e.g., phase-locked) to the PPS signal or like signal of the first signal. The phase offset according to which the second signal is transmitted to the camera is based on the lidar time. For example, the phase offset can be determined based on an angle of the lidar sensor. The angle of the lidar sensor may, for example, be indicated in a transmission received from the lidar sensor. Where the camera is a visible-light camera, a mid-exposure of the camera may be timed according to the phase offset. Examples for determining the phase offset for the camera based on the angle of the lidar sensor are described above with respect to FIG. 7.

At 1006, the lidar data and the lidar time are received from the lidar sensor and the camera data and the camera time are received from the camera. Receiving the lidar data and the lidar time can include receiving a signal by the component that transmitted the first signal to the lidar sensor, the signal being transmitted from the lidar sensor. Receiving the camera data and the camera time can include receiving a signal by the component that transmitted the second signal to the camera, the signal being transmitted from the camera. The transmissions from the camera and the lidar sensor may be in different forms. For example, the lidar sensor may transmit the lidar data and the lidar time within a UDP packet, an NMEA string, or the like. In another example, the camera may transmit the camera data and the camera time in a compressed file format.

At 1008, the component that received the lidar data, the lidar time, the camera data, and the camera time determines that the camera data corresponds to the lidar data. Determining that the camera data corresponds to the lidar data includes determining that the event measured by the camera data is the same event measured by the lidar data. The determining can include adjusting one or both of the lidar time or the camera time to correspond to the master clock of the multi-sensor environment and then comparing the lidar time to the camera time.

For example, the camera time may be received in a form according to the master clock. However, the lidar time may be received in a form according to a sensor clock of the lidar sensor. The component receiving the lidar time can adjust the lidar time to correspond to the master clock based on the master time at which it transmitted the signal causing the lidar data to be produced to the lidar sensor and based on a latency associated with the lidar sensor. After adjustments are made to the lidar time and/or the camera time (or neither, as the case may be), a difference between the lidar time and the camera time can be compared against a threshold amount of time (e.g., five microseconds). If that difference is less than the threshold, the component determines that the camera data corresponds to the lidar data.

At 1010, subsequent to determining that the camera data corresponds to the lidar data, a timing of an event is associated with the lidar data and the camera data. The event may, for example, correspond to an object detected using the lidar sensor and the camera. The timing of the event may therefore reflect a time according to the master clock at which the event occurred.

In some implementations, the second technique 1000 can include time synchronization of multiple lidar sensors and/or multiple cameras. For example, a signal can be transmitted to a second camera at a time representative of a second phase offset from the master time. That signal can include a trigger for causing the second camera to produce second camera data. For example, a trigger input indicative of the master time can be transmitted to a microcontroller that causes the transmission of the second signal to the first camera at the first phase offset and the transmission of the third signal to the second camera at the second phase offset. The microcontroller may receive instructions for delaying the first camera and/or second camera from producing camera data from a computer that received the triggers from the component. The timing of the event would thus further be associated with the second camera data.

In another example, a signal can be transmitted to a second lidar sensor at the master time. That signal can include a PPS signal or like signal (e.g., timed contemporaneously with a PPS signal or like signal included in the first signal transmitted to the first lidar sensor) for causing the second lidar sensor to produce second lidar data indicative of a distance to a second object at a second lidar time. In such a case, the first camera and/or the second camera (to the extent both are included in the system) may produce camera data corresponding to one of the first lidar data or the second lidar data.

For example, there may be a 180 degree rotational offset between the first lidar sensor and the second lidar sensor. This rotational offset would prevent the cameras from measuring a same event as both of the lidar sensors. However, in some cases, each of the cameras may measure a same event as one of the lidar sensors, such as where each camera is timed according to an angle of one of the lidar sensors. Alternatively, the first lidar sensor and the second lidar sensor may be included in the same lidar cluster. In such a case, the first lidar sensor, the second lidar sensor, the first camera, and the second camera could all potentially measure the same event.

In some implementations, determining that the camera data corresponds to the lidar data can include comparing the camera data and the lidar data. For example, a point cloud or other model associated with the lidar data can be analyzed. Aspects of the point cloud or other model may then be compared against an image associated with the camera data. In some implementations, associating first sensor data with second sensor data can include combining or otherwise incorporating the kinematic, dynamic, or other measurements of those first sensor data and second sensor data.

What is claimed is:

1. A method for time synchronization of sensor data in a multi-sensor environment using a master time, the method comprising:

transmitting, from a component that derives the master time, a first signal to a first sensor of the multi-sensor environment and to a second sensor of the multi-sensor environment, the first signal including a master time stamp;

receiving, by the component, a second signal from the first sensor, the second signal including first sensor data produced using the first sensor, the second signal including a first time stamp determined by the first sensor based on the master time and a latency associated with the first sensor, the first time stamp indicating a time of an event associated with the first sensor data;

receiving, by the component, a third signal from the second sensor, the third signal including second sensor data produced using the second sensor, the third signal including a second time stamp determined by the second sensor based on the master time stamp and a latency associated with the second sensor, the second time stamp indicating a time of an event associated with the second sensor data; and determining that the first sensor data corresponds to the second sensor data based on the first time stamp and the second time stamp.

2. The method of claim 1, wherein the first signal includes a trigger for causing the first sensor to produce the first sensor data.

3. The method of claim 1, further comprising:
subsequent to determining that the first sensor data corresponds to the second sensor data, associating the event associated with the first sensor data and the event associated with the second sensor data, wherein determining that the first sensor data corresponds to the second sensor data includes determining that a difference between the first time and the second time is less than a threshold.

4. The method of claim 1, wherein the latency associated with the first sensor changes based on at least one of a condition associated with the multi-sensor environment or a configuration of the first sensor.

5. A method for time synchronization of sensor data in a multi-sensor environment using a master time, the method comprising:
initializing, by a component that derives the master time, the master time according to a geolocation time obtained using a geolocation component of the multi-sensor environment, the geolocation time indicating a time according to a geolocation system clock external to the multi-sensor environment;
transmitting, from the component, a first signal to a first sensor of the multi-sensor environment, the first signal including a master time stamp;
receiving, by the component, a second signal from the first sensor, the second signal including first sensor data produced using the first sensor, the second signal including a first time stamp determined by the first sensor based on the master time and a latency associated with the first sensor, the first time stamp indicating a time of an event associated with the first sensor data; and
determining that the first sensor data corresponds to second sensor data produced using a second sensor of the multi-sensor environment, the determining based on the first time stamp and a second time stamp indicating a time of an event associated with the second sensor data.

6. The method of claim 5, wherein the first signal includes a trigger for causing the first sensor to produce the first sensor data.

7. The method of claim 5, further comprising:
subsequent to determining that the first sensor data corresponds to the second sensor data, associating the event associated with the first sensor data and the event associated with the second sensor data, wherein determining that the first sensor data corresponds to the second sensor data includes determining that a difference between the first time stamp and the second time stamp is less than a threshold.

8. The method of claim 5, wherein the latency associated with the first sensor changes based on at least one of a condition associated with the multi-sensor environment or a configuration of the first sensor.

9. A non-transitory computer-readable storage device including program instructions executable by one or more processors that, when executed, cause the one or more processors to perform operations for time synchronization of sensor data in a multi-sensor environment, the operations comprising:
transmitting a first signal to a lidar sensor to cause the lidar sensor to produce first sensor data at a first time;
transmitting a second signal to a second sensor to cause the second sensor to produce second sensor data at a second time, wherein the second time is determined based on the first time and a phase offset; and
associating the first sensor data with the second sensor data based on the first time and the second time.

10. The non-transitory computer-readable storage device of claim 9, the operations further comprising:
determining the phase offset based on an angle of the lidar sensor.

11. The non-transitory computer-readable storage device of claim 9, wherein the second sensor is a camera.

12. The non-transitory computer-readable storage device of claim 11, wherein a mid-exposure of the camera is timed according to the phase offset.

13. The non-transitory computer-readable storage device of claim 9, wherein the first signal includes a pulse-per-second signal defining a periodic basis for producing the first sensor data using the lidar sensor and the second signal includes a trigger for causing the second sensor to produce the second sensor data, and the trigger is synchronized to the pulse-per-second signal.

14. The non-transitory computer-readable storage device of claim 9, wherein the phase offset is a first phase offset, the operations further comprising:
transmitting a third signal to a third sensor to cause the third sensor to produce third sensor data at a third time, wherein the third time is determined based on the first time and a second phase offset; and
associating the first sensor data with the third sensor data based on the first time and the third time.

15. A system for time synchronization of sensor data in a multi-sensor environment, comprising:
a control component that is configured to:
transmit a first signal to a lidar sensor to cause the lidar sensor to produce first sensor data at a first time,
transmit a second signal to a second sensor to cause the second sensor to produce second sensor data at a second time, wherein the second time is determined based on the first time and a phase offset, and
associate the first sensor data with the second sensor data based on the first time and the second time.

16. The system of claim 15, wherein the control component is further configured to determine the phase offset based on an angle of the lidar sensor.

17. The system of claim 15, wherein the second sensor is a camera.

18. The system of claim 17, wherein a mid-exposure of the camera is timed according to the phase offset.

19. The system of claim 15, wherein the first signal includes a pulse-per-second signal defining a periodic basis for producing the first sensor data using the lidar sensor and the second signal includes a trigger for causing the second sensor to produce the second sensor data, and the trigger is synchronized to the pulse-per-second signal.

20. The system of claim 15, wherein the phase offset is a first phase offset, and the control component is further configured to:
transmit a third signal to a third sensor to cause the third sensor to produce third sensor data at a third time, wherein the third time is determined based on the first time and a second phase offset, and
associate the first sensor data with the third sensor data based on the first time and the third time.

21. A system for time synchronization of sensor data in a multi-sensor environment using a master time, comprising:
a component that derives the master time, wherein the component is configured to:
transmit a first signal to a first sensor of the multi-sensor environment and to a second sensor of the multi-sensor environment, the first signal including a master time stamp,
receive a second signal from the first sensor, the second signal including first sensor data produced using the first sensor, the second signal including a first time stamp determined by the first sensor based on the master time and a latency associated with the first sensor, the first time stamp indicating a time of an event associated with the first sensor data,
receive a third signal from the second sensor, the third signal including second sensor data produced using the second sensor, the third signal including a second time stamp determined by the second sensor based on the master time stamp and a latency associated with the second sensor, the second time stamp indicating a time of an event associated with the second sensor data, and
determine that the first sensor data corresponds to the second sensor data based on the first time stamp and the second time stamp.

22. The system of claim 21, wherein the first signal includes a trigger for causing the first sensor to produce the first sensor data.

23. The system of claim 21, wherein the component is configured to associate the event associated with the first sensor data and the event associated with the second sensor data subsequent to a determination that the first sensor data corresponds to the second sensor data, wherein the component is configured to determine that the first sensor data corresponds to the second sensor data when a difference between the first time and the second time is less than a threshold.

24. The system of claim 21, wherein the latency associated with the first sensor changes based on at least one of a condition associated with the multi-sensor environment or a configuration of the first sensor.

25. The system of claim 21, wherein the component is further configured to:
receive a geolocation time using a geolocation component, the geolocation time indicating a time according to a geolocation system clock external to the multi-sensor environment, and
store a difference between the master time and the geolocation time.

26. A system for time synchronization of sensor data in a multi-sensor environment using a master time, comprising:
a component that derives the master time, wherein the component is configured to:
initialize the master time according to a geolocation time obtained using a geolocation component of the multi-sensor environment, the geolocation time indicating a time according to a geolocation system clock external to the multi-sensor environment,
transmit a first signal to a first sensor of the multi-sensor environment, the first signal including a master time stamp,
receive a second signal from the first sensor, the second signal including first sensor data produced using the first sensor, the second signal including a first time stamp determined by the first sensor based on the master time and a latency associated with the first sensor, the first time stamp indicating a time of an event associated with the first sensor data, and
determine that the first sensor data corresponds to second sensor data produced using a second sensor of the multi-sensor environment based on the first time stamp and a second time stamp indicating a time of an event associated with the second sensor data.

27. The system of claim 26, wherein the first signal includes a trigger for causing the first sensor to produce the first sensor data.

28. The system of claim 26, wherein the component is configured to associate the event associated with the first sensor data and the event associated with the second sensor data subsequent to a determination that the first sensor data corresponds to the second sensor data.

29. The system of claim 28, wherein the component is configured to determine that the first sensor data corresponds to the second sensor data when a difference between the first time stamp and the second time stamp is less than a threshold.

30. The system of claim 26, wherein the latency associated with the first sensor changes based on at least one of a condition associated with the multi-sensor environment or a configuration of the first sensor.

* * * * *